(12) United States Patent
Tanase et al.

(10) Patent No.: US 6,944,104 B2
(45) Date of Patent: Sep. 13, 2005

(54) METHOD OF MOVING OPTICAL PICKUP, OPTICAL PICKUP, AND OPTICAL DISC APPARATUS

(75) Inventors: Hironobu Tanase, Kanagawa (JP); Kenji Yamamoto, Kanagawa (JP); Gakuji Hashimoto, Saitama (JP)

(73) Assignee: Sony Corporation (JP)

( * ) Notice: Subject to any disclaimer, the term of this patent is extended or adjusted under 35 U.S.C. 154(b) by 94 days.

(21) Appl. No.: 10/343,379

(22) PCT Filed: Jun. 10, 2002

(86) PCT No.: PCT/JP02/05719

§ 371 (c)(1),
(2), (4) Date: May 27, 2003

(87) PCT Pub. No.: WO02/103688

PCT Pub. Date: Dec. 27, 2002

(65) Prior Publication Data
US 2003/0179664 A1 Sep. 25, 2003

(30) Foreign Application Priority Data
Jun. 18, 2001 (JP) .......................................... 2001-183145
Jul. 19, 2001 (JP) .......................................... 2001-219109

(51) Int. Cl.⁷ ............................................... G11B 7/09
(52) U.S. Cl. ................................ 369/44.32; 369/44.23; 369/112.02
(58) Field of Search ........................... 369/44.32, 44.23, 369/112.02, 53.34

(56) References Cited

U.S. PATENT DOCUMENTS 6,034,935 A * 3/2000 Kim et al. ................ 369/53.28
6,552,984 B1 * 4/2003 Yamazaki et al. ........ 369/53.19

FOREIGN PATENT DOCUMENTS

| JP | 6-295461 | 10/1994 |
| JP | 2001-266394 | 9/2001 |
| JP | 2002-117568 | 4/2002 |

OTHER PUBLICATIONS

Electronic translation of JP 2002–117568.*
Patent Abstracts of Japan, for JP 2002–117568.*

* cited by examiner

Primary Examiner—W. R. Young
Assistant Examiner—Lixi Chow
(74) Attorney, Agent, or Firm—Rader, Fishman & Grauer, PLLC; Ronald P. Kananen

(57) ABSTRACT

The present invention can simplify and miniaturize an optical pickup and further can prevent the deterioration of various characteristics even if an aberration correction mechanism is composed of a liquid crystal and the like by transmitting a drive signal of an actuator and a drive signal of an aberration correction mechanism by multiplexing them.

20 Claims, 19 Drawing Sheets

METHOD OF MOVING OPTICAL PICKUP, OPTICAL PICKUP, AND OPTICAL DISC APPARATUS

BACKGROUND OF THE INVENTION

1. Technical Field

The present invention relates to a method of moving an optical pickup, the optical pickup, and an optical disc apparatus capable of being applied to a case in which an aberration correction mechanism is composed of, for example, a liquid crystal. The present invention can simplify and miniaturize the optical pickup and further can prevent the deterioration of various characteristics even if the aberration correction mechanism is composed of the liquid crystal and the like by transmitting a drive signal of an actuator and a drive signal of an aberration correction mechanism by multiplexing them.

2. Background Art

Conventionally, in an optical pickup of an optical disc apparatus, it is required to reduce the size and the weight of an actuator for moving an objective lens as the transmission rate and the density of an optical disc is increased.

Further, since the optical pickup is required to accurately reproduce data from bit trains created in a high density, it is proposed to dispose an aberration correction mechanism for correcting the aberration of a laser beam.

That is, when the numerical aperture of the objective lens is increased by an increase in the density of the optical disc, it is difficult for the optical pickup to create a beam spot having a predetermined shape on the information recording surface of the optical disc due to aberration caused by the dispersed thickness of the optical disc. As a result, crosstalk is increased and a C/N ratio is deteriorated in a reproduced signal that is the result of received return light, thereby an error rate is deteriorated in the optical disc apparatus.

Japanese Unexamined Patent Application Publication No. 2000-131603 proposes an arrangement for correcting the wavefront of a laser beam by a lens interposed between an objective lens and a laser beam source as an aberration correction mechanism for correcting the aberration.

Incidentally, it may be difficult for this type of the aberration correction mechanism to sufficiently correct the aberration because positional dislocation is arisen between the aberration correction mechanism and the objective lens. Thus, it is contemplated to hold the objective lens and the aberration correction mechanism integrally.

In this case, however, since the objective lens and the aberration correction mechanism are moved integrally by an actuator, the weight of the subject to be moved by the actuator is increased. Thus, it is difficult to reduce the size and weight of the optical pickup. In particular, when an optical disc having a multi-layered information recording surface is accessed, it is difficult to reduce the size of the optical pickup because the movable range of the aberration correction mechanism increases.

Thus, it is contemplated to compose the aberration correction mechanism of a liquid crystal in place of the aberration correction mechanism composed of the lens. That is, when the aberration correction mechanism is composed of the liquid crystal, even if the liquid crystal is moved by an actuator together with an objective lens, it is contemplated that the weight of a subject to be moved can be reduced as compared with the case in the aberration correction mechanism is composed of the lens. Thus, this arrangement seems to be suitable to the reduction of size and weight of the optical pickup.

However, when the aberration correction mechanism is composed of the liquid crystal, a drive signal must be supplied to the liquid crystal, from which a problem is arisen in that the arrangement of an optical pickup is made complex by a line for supplying the signal. That is, in the actuator of the conventional arrangement, a tracking control voice coil (tracking coil) and a focus control voice coil (focus coil) are disposed on the objective lens side as well as a magnetic circuit holding these two types of the voice coils on a securing side is disposed, and tracking control and focus control are executed by moving these two types of the voice coils according to a tracking error signal and a focus error signal. Thus, when a liquid crystal drive signal supply line is provided additionally, it cannot be avoided that the arrangement of the optical pickup is made complex thereby.

Further, the provision of the liquid crystal drive signal supply line makes it difficult to drive the actuator at a high speed. Further, when the signal supply line is simply composed of a cable, the tension of the cable is changed when it is moved, and there is a possibility that the objective lens is not smoothly moved.

Incidentally, in a current optical pickup, the movable side thereof is held by suspensions composed of slender rod-shaped springs, and signal supply-lines for the two types of the voice coils are composed of the suspensions. Thus, there is contemplated a method of increasing the number of the suspensions to transmit the liquid crystal drive signal. With this arrangement, however, the weight of a movable section is increased and further the spring constants of the suspensions are increased, whereby it is difficult to drive the actuator at a high speed. Further, it is difficult to reduce the size of the optical pickup. Furthermore, it is also difficult to keep the balance of the spring constants of the respective suspensions.

DISCLOSURE OF INVENTION

An object of the present invention, which was made in view of the above points, is to provide a method of driving an optical pickup, the optical pickup, and an optical disc apparatus capable of simplifying an arrangement, reducing a size, and preventing the deterioration of various characteristics even if an aberration correction mechanism is composed of liquid crystals and the like.

To solve the above problem, in the present invention applied to a method of driving an optical pickup, an aberration correction mechanism for correcting the wavefront of a laser beam incident on an objective lens is held integrally with the objective lens, a transmission unit creates a transmission signal by multiplexing a drive signal of the actuator with a drive signal of the aberration correction mechanism and transmits the transmission signal to a subject to be moved by the actuator, and a demodulation circuit on the side of the subject to be moved separates the drive signal of the actuator and the drive signal of the aberration correction mechanism from the transmission signal.

According to the arrangement of the present invention applied to the method of driving the optical pickup, the drive signal of the actuator and the drive signal of the aberration correction mechanism can be transmitted to the subject to be moved and processed through a smaller number of transmission paths even if the objective lens and aberration correction mechanism are held integrally and moved, by holding the aberration correction mechanism for correcting the wavefront of the laser beam incident on the objective lens integrally with the objective lens, by creating the transmission signal by multiplexing the drive signal of the actuator with the drive signal of the aberration correction mechanism by the transmission unit and transmitting the transmission signal to the subject to be moved by the actuator by the transmission unit, and by separating the drive signal of the actuator and the drive signal of the aberration correction mechanism from the transmission signal by the demodulation circuit on the side of the subject to be moved. Thus, an increase in the number of the transmission paths due to an increase in the number of signals to be transmitted is prevented, thereby the arrangement can be simplified and a size can be miniaturized. Further, the subject to be moved can be moved smoothly at a high speed approximately similarly to a case in which the signal of the aberration correction mechanism is not transmitted, thereby the deterioration of various characteristics can be prevented.

Further, the present invention applied to an optical pickup includes an aberration correction mechanism held integrally with an objective lens for correcting the wavefront of a laser beam incident on the objective lens, and a demodulation circuit movably held integrally with the objective lens for separating a drive signal of an actuator and a drive signal of the aberration correction mechanism from a transmission signal transmitted from a fixed side of the actuator.

According to the arrangement of the present invention applied to the optical pickup, the drive signal of the actuator and the drive signal of the aberration correction mechanism can be transmitted to the subject to be moved and processed through a smaller number of transmission paths even if the objective lens and aberration correction mechanism are held integrally and moved, by providing the present invention with the aberration correction mechanism held integrally with the objective lens for correcting the wavefront of the laser beam incident on the objective lens, and the demodulation circuit movably held integrally with the objective lens for separating the drive signal of the actuator and the drive signal of the aberration correction mechanism from the transmission signal transmitted from the fixed side of the actuator. Thus, an increase in the number of the transmission paths due to an increase in the number of signals to be transmitted is prevented, thereby the arrangement can be simplified and a size can be miniaturized. Further, the subject to be moved can be moved smoothly at a high speed approximately similarly to the case in which the signal of the aberration correction mechanism is not transmitted, thereby the deterioration of various characteristics can be prevented.

The present invention applied to an optical disc apparatus includes an aberration correction mechanism held integrally with an objective lens for correcting the wavefront of a laser beam incident on the objective lens, a drive signal creation circuit for creating a drive signal of an actuator and a drive signal of the aberration correction mechanism, a transmission unit for creating a transmission signal by multiplexing the drive signal of the actuator with the drive signal of the aberration correction mechanism and for transmitting the transmission signal to a movable subject side of the actuator, and a demodulation circuit held integrally with the objective lens for separating the drive signal of the actuator and the drive signal of the aberration correction mechanism from the transmission signal.

According to the arrangement of the present invention applied to the optical disc apparatus, the drive signal of the actuator and the drive signal of the aberration correction mechanism can be transmitted to the subject to be moved of the optical pickup and processed through a smaller number of transmission paths even if the objective lens and aberration correction mechanism are held integrally and moved, by providing the present invention with the aberration correction mechanism held integrally with the objective lens for correcting the wavefront of the laser beam incident on the objective lens, the drive signal creation circuit for creating the drive signal of the actuator and the drive signal of the aberration correction mechanism, the transmission unit for creating the transmission signal by multiplexing the drive signal of the actuator with the drive signal of the aberration correction mechanism and for transmitting the transmission signal to the movable subject side of the actuator, and the demodulation circuit held integrally with the objective lens for separating the drive signal of the actuator and the drive signal of the aberration correction mechanism from the transmission signal. Thus, an increase in the number of the transmission paths due to an increase in the number of signals to be transmitted is prevented, thereby the arrangement can be simplified and a size can be miniaturized. Further, the subject to be moved can be moved smoothly at a high speed approximately similarly to the case in which the signal of the aberration correction mechanism is not transmitted, thereby the deterioration of various characteristics can be prevented.

BEST MODE FOR CARRYING OUT THE INVENTION

Figure 1:
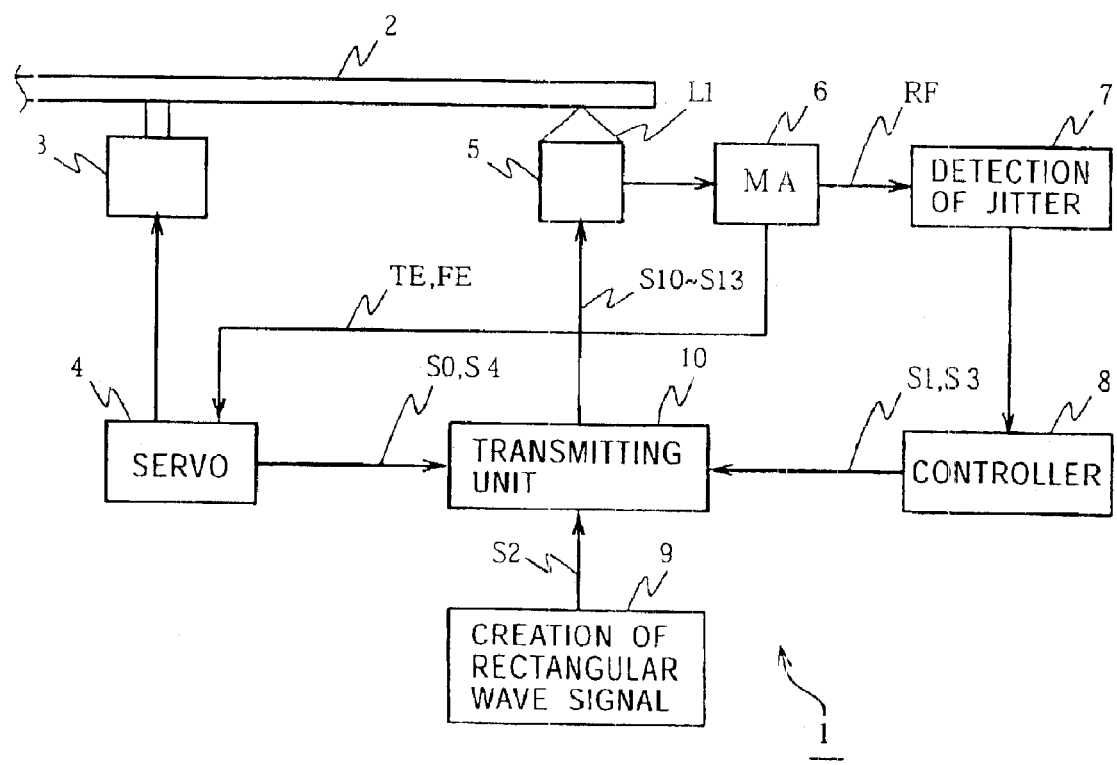
FIG. 1 is a block diagram showing an optical disc apparatus according to a first embodiment of the present invention.

Embodiments of the present invention will be described below in detail by appropriately referring to the drawings.
(1) First Embodiment
(1-1) Arrangement of First Embodiment FIG. 1 is a block diagram showing an optical disc apparatus according to the embodiment of the present invention. In the optical disc apparatus 1, an optical disc 2 is a phase change type optical disc capable of executing high density recording. A spindle motor 3 drives the optical disc 2 in rotation at a predetermined rotating speed under the control of a servo circuit 4.

An optical pickup 5 irradiates a laser beam L1 to the optical disc 2, receives return light, and outputs the result of the received light. Thus, the optical disc apparatus 1 creates a tracking error signal TE and the like by processing the result of the received light, and further can reproduce the data recorded on the optical disc 2. Further, the optical pickup 5 intermittently activates the quantity of light to be irradiated to the optical disc 2 by a not shown drive circuit to thereby record desired data by sequentially forming bit trains on the optical disc 2.

After a matrix circuit (MA) 6 subjects the result of the received light supplied from the optical pickup 5 to current voltage conversion processing, it subjects the resultant result of the received laser beam to matrix operation processing to thereby create the tracking error signal TE whose signal level changes according to the quantity of a tracking error, a focus error signal FE whose signal level changes according to the quantity of a focus error, a wobble signal whose signal level changes according to a meander of a group formed on the optical disc 2, a reproduced signal RF whose signal level changes according to the bit trains formed on the optical disc 2, and the like. Thus, the optical disc apparatus 1 reproduces the data recorded on the optical disc 2 by subjecting the reproduced signal RF to signal processing.

A jitter detection circuit 7 detects and outputs the quantity of jitter of the reproduced signal RF by subjecting the reproduced signal RF, which is obtained from an emboss pit or a record mark of the optical disc 2, to binarization processing.

A controller 8 controls the operation of the optical disc apparatus 1 in its entirety by executing a predetermined processing procedure. In this control, the controller 8 calculates the control quantity of an aberration correction mechanism disposed in the optical pickup 5 based on the result of the jitter detected by the jitter detection circuit 7 and outputs drive signals S1 and S3 of the aberration correction mechanism from the result of calculation.

The servo circuit 4 outputs tracking and focus control drive signals S0 and S4, used to drive an actuator disposed in the optical pickup 5 based on the tracking error signal TE and the focus error signal FE. Thus, a drive signal creation circuit, which creates the drive signals of the actuator for driving an objective lens and the drive signals of the aberration correction mechanism, can be composed of the servo circuit 4 and the controller 8.

A rectangular wave signal creation circuit 9 creates and outputs a rectangular wave signal S2 having a duty ratio of 50[%], in which a direct current level is a zero level as well as having an amplitude value sufficiently larger than that of a drive voltage of the aberration correction mechanism disposed in the optical pickup 5. The transmission unit 10 mutiplexes the tracking and focus control drive signals S0 and S4 and the drive signals S1 and S3 of the aberration correction mechanism to thereby create transmission drive signals S10–S13 and outputs them to the optical pickup 5.

In the optical disc apparatus 1, the optical pickup 5 is subjected to tracking and focus control and further the aberration correction mechanism is driven by these drive signals S10–S13.

Figure 2:
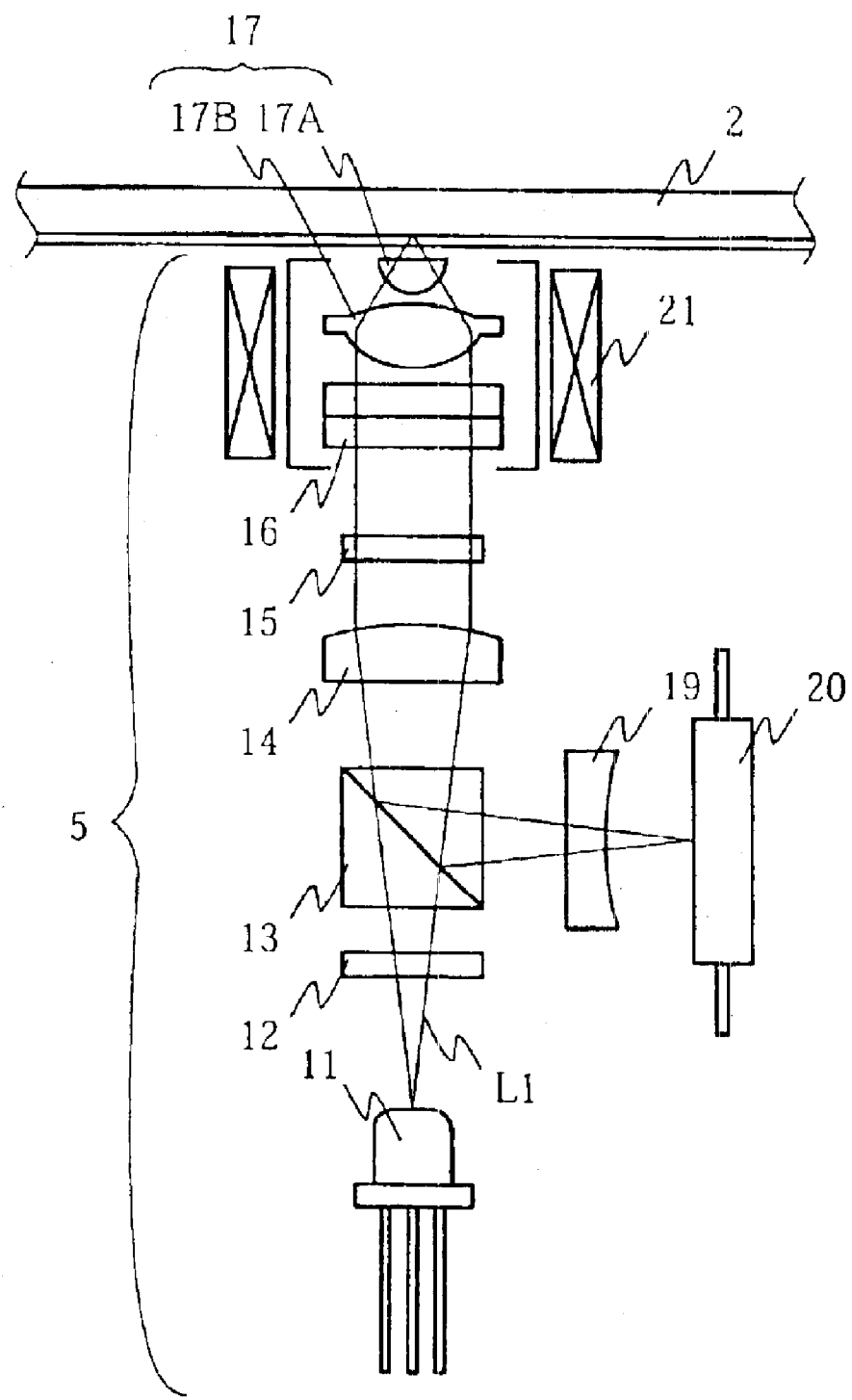
FIG. 2 is a side elevational view showing an optical system of an optical pickup applied to the optical disc apparatus of FIG. 1.

FIG. 2 shows a side elevational view showing an optical system of the optical pickup 5. The optical pickup 5 projects the laser beam L1 from a laser diode 11 arranged as an integrate circuit together with a quantity of light monitor mechanism and creates 0-degree and ±1-degree diffraction light by a grating 12. The optical pickup 5 transmits the laser beam L1 composed of the 0- and ±1-degree diffraction light through a subsequent polarizing beam splitter 13 and introduces it to a collimator lens 14 where the laser beam L1 is converted into approximately parallel rays. Further, after the laser beam L1 is polarized by a subsequent ¼ wavelength plate 15, it is condensed on an information recording surface of the optical disc 2 through an objective lens 17 composed of two lenses 17A and 17B and having a high numerical aperture.

In the optical pickup 5, the aberration correction mechanism 16 composed of liquid crystals is interposed between the ¼ wavelength plate 15 and the objective lens 17, and the aberration of the laser beam L1 is corrected by the aberration correction mechanism 16.

Thus, when the laser beam L1 is irradiated to the optical disc 2 through the above light path, the returned beam of the laser beam L1 reversely passes through the light path of the laser beam L1 in the optical pickup 5 and is separated from the light path of the laser beam L1 by the polarizing beam splitter 13.

After the returned beam is processed by a multi-lens 19, it is received by a light receiving element 20 having a plurality of light receiving surfaces each formed in a predetermined shape. The optical pickup 5 outputs the result of the light received by the light receiving element 20 to the matrix circuit 6 described above. Note that, in the optical disc apparatus 1, the tracking error signal TE is created by a differential push pull method and the focus error signal FE is created by an astigmatism method by processing the returned laser beam through the multi-lens 19 and by subsequently processing the result of the light received by the light receiving element 20 through the matrix circuit 6.

In the optical pickup 5, the objective lens 17 and the aberration correction mechanism 16 of the optical system disposed as described above are held integrally and driven integrally by the actuator 21. Thus, the optical pickup 5 can effectively avoid the positional displacement between the objective lens 17 and the aberration correction mechanism 16 to thereby avoid the deterioration of characteristics caused by the positional displacement.

Figure 3:
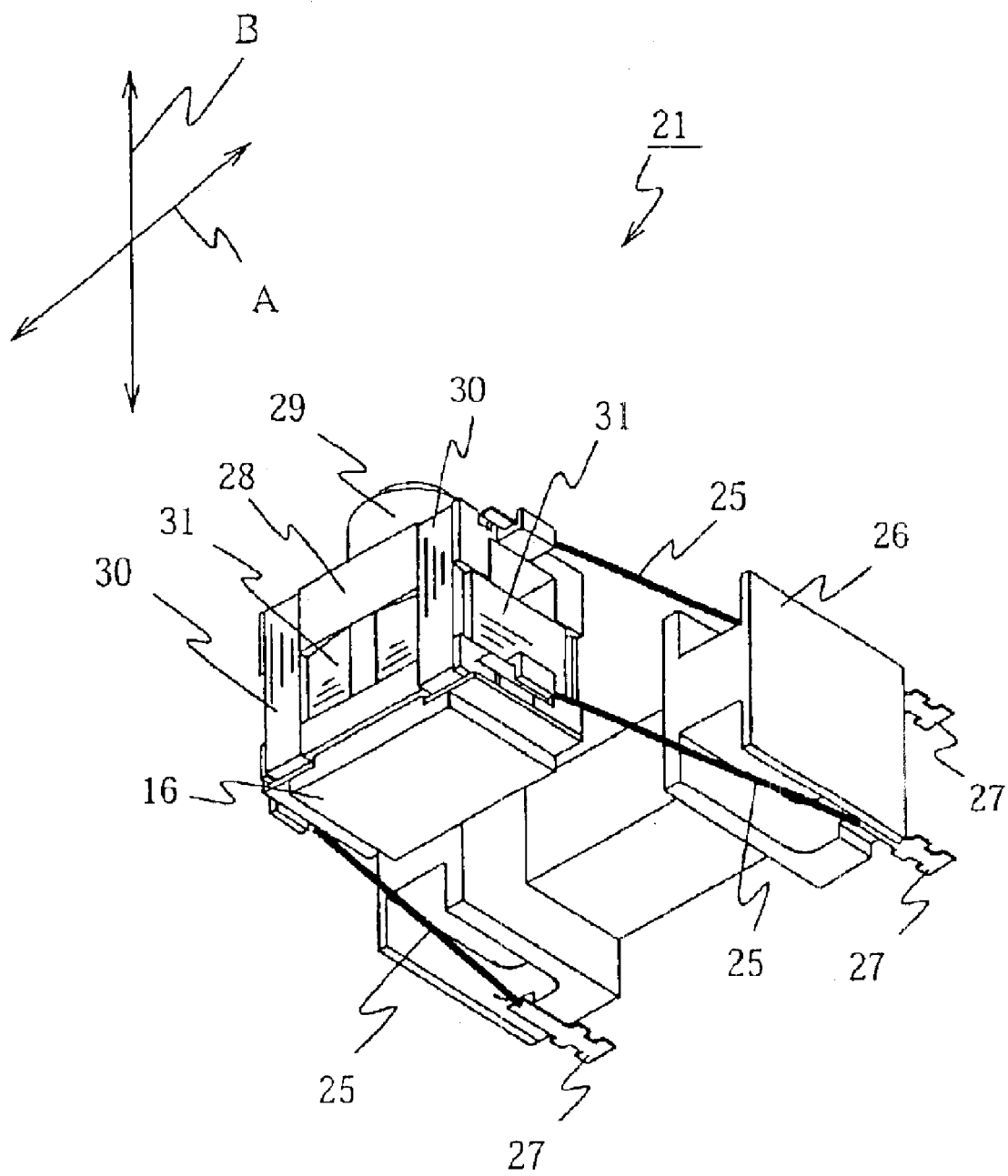
FIG. 3 is a perspective view showing a part of an actuator of FIG. 2.
Figure 4A:
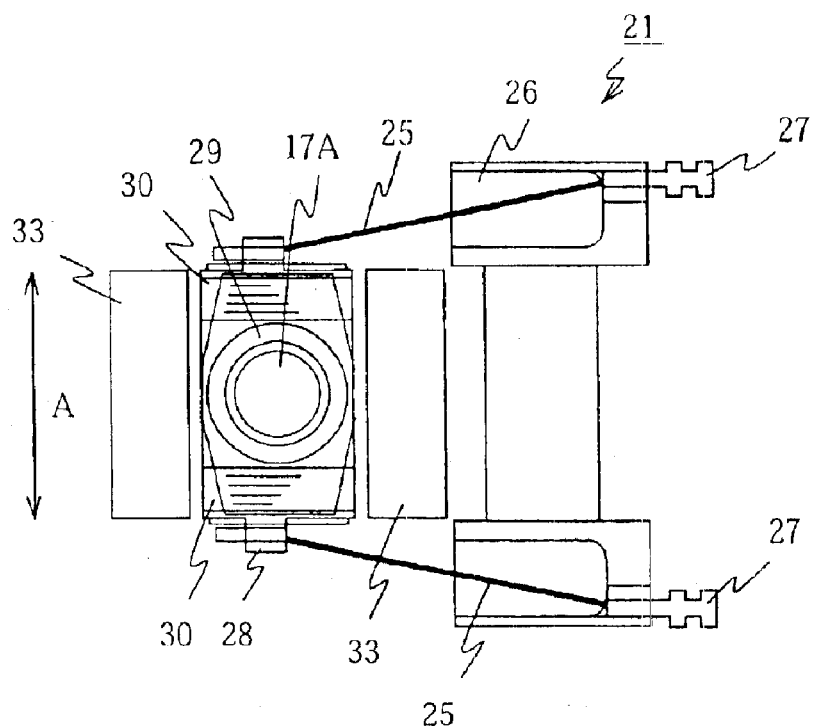
FIGS. 4(A) and 4(B) are a plan view and a see-through view showing a part of the actuator of FIG. 2.
Figure 4B:
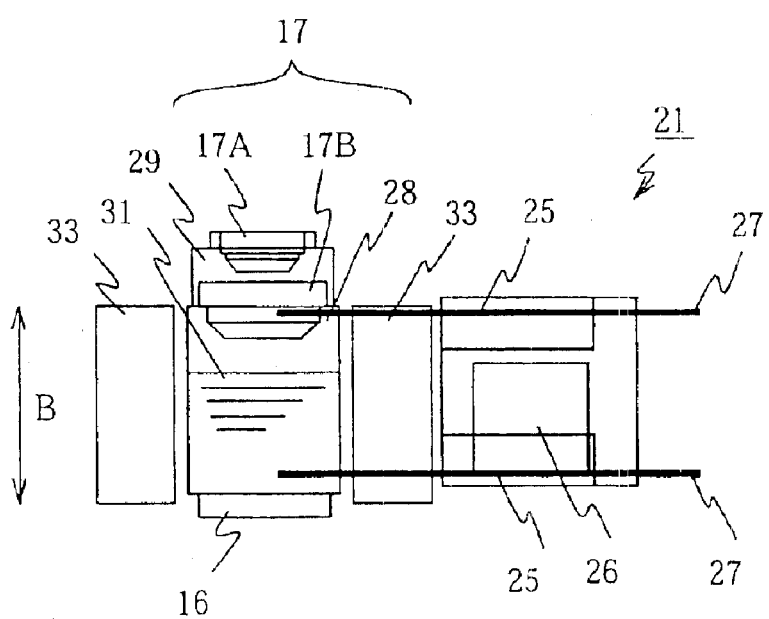

FIG. 3 is a perspective view showing the actuator 21 for integrally holding the objective lens 17 and the aberration correction mechanism 16 when it is viewed from the laser diode side, FIG. 4(A) is a plan view showing the actuator 21 when it is viewed from the optical disc 2 side, and FIG. 4(B) is a see-through view showing a part of the cross section of the actuator 21 when it is viewed from a side.

The actuator 21 holds the optical system by suspension bases 26 through suspensions 25 composed of slender rod-shaped springs. Each suspension base 26 is a holding member held by a base member of the optical pickup 5, is composed of a resin material and the like, and has four terminals 27 on the back surface thereof through which the drive signals S10–S13 are input, respectively. The actuator 21 is arranged such that one ends of the suspensions 25 are connected to the terminals 27, and the other ends thereof project to a side opposite to the side where the terminals 27 are disposed.

In the actuator 21, bobbins 28 composed of a resin material are held at the other ends of the suspensions 25. The bobbins 28 hold the objective lens 17 through a lens holder 29 and further hold the aberration correction mechanism 16. Further, a tracking coil 30 and a focus coil 31 are wound around each bobbin 28. The actuator 21 can integrally move the objective lens 17 and the aberration correction mechanism 16 in various directions by flexing the suspensions 25.

The actuator 21 has a pair of magnets 33 disposed thereto so that the bobbins 28 are clamped therebetween across predetermined spaces. Thus, the objective lens 17 and the aberration correction mechanism 16 can be integrally moved in a radial direction of the optical disc 2 as shown by an arrow A by driving the tracking coils 30, and a distance to the optical disc 2 can be changed by integrally moving the objective lens 17 and the aberration correction mechanism 16 as shown by an arrow B by driving the focus coils 31.

Figure 5:
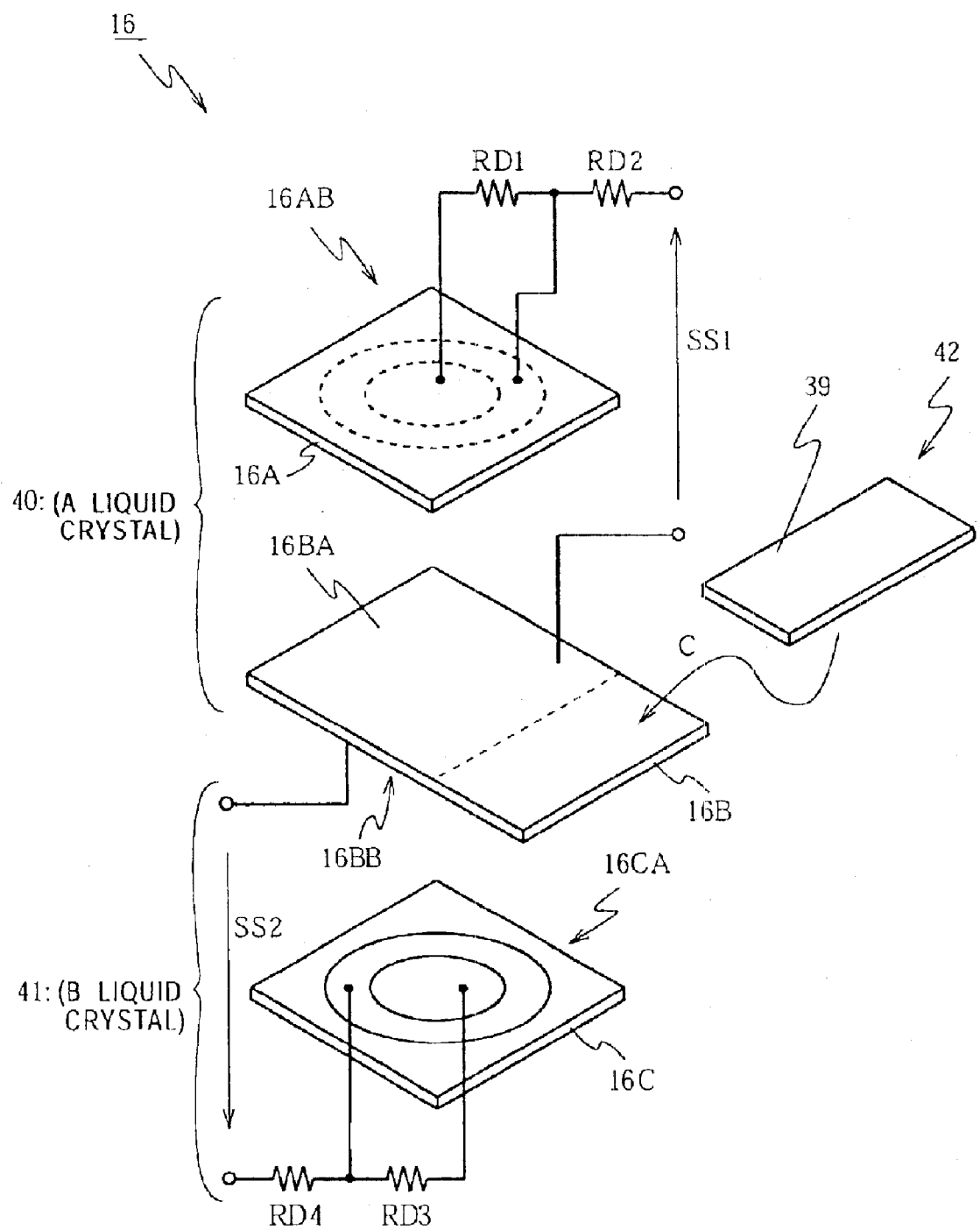
FIG. 5 is an exploded perspective view explaining an aberration correction mechanism applied to the optical pickup of FIG. 2.

FIG. 5 is an exploded perspective view showing an arrangement of the aberration correction mechanism 16 held integrally with the objective lens 17 as described above. The aberration correction mechanism 16 is composed of laminated glass substrates 16A, 16B and 16C having liquid crystals sandwiched between the respective ones of them. The central glass substrate 16B has transparent electrodes 16BA and 16BB formed on both the approximately entire surfaces thereof, and the upper and lower glass substrates 16A and 16C have transparent electrodes 16AB and 16CA formed on the surfaces thereof confronting the transparent electrodes 16BA and 16BB. Note that the transparent electrodes 16AB and 16CA are connected to each other on the glass substrate 16B.

Each of the transparent electrodes 16AB and 16CA has a circular inner peripheral electrode at a center, and a ring-shaped outer peripheral electrode is formed so as to surround the inner peripheral electrode. These inner and outer peripheral electrodes are subjected to voltage division by resistors and applied with predetermined drive signals SS1 and SS2 between them and the transparent electrodes 16BA and 16BB of the confronting glass substrate 16B so that aberration can be corrected by correcting the wavefront of the laser beam L1 passing through the aberration correction mechanism 16.

In the aberration correction mechanism 16, the central glass substrate 16B is formed in a large area so as to partly protrude with respect to the upper and lower glass substrates 16A and 16C, and a flexible wiring substrate 39 is disposed to the partly protruding portion as shown by an arrow C.

Here, voltage dividing resistors RD1–RD4 for dividing the drive signals SS1 and SS2 described above are mounted on the flexible wiring substrate 39, and further a demodulation circuit 42 for creating the drive signals SS1 and SS2 from the drive signals S10–S13 is mounted thereon. Thus, in the optical pickup 5, the drive signals S10–S13 output from the transmission unit 10 are input to the flexible wiring substrate 39 through the suspensions 25, and further the tracking coils 30 and the focus coils 31 are connected to the flexible wiring substrate 39. Thus, in the optical pickup 5, a connection processing job of the tracking coils 30 and the focus coils 31 can be simplified by effectively making use of the flexible wiring substrate 39. Further, the voltage dividing resistors RD1–RD4 are mounted by making use of the limited space of the optical pickup 5, and further the demodulation circuit 42 of the drive signals SS1 and SS2 is mounted thereon.

Note that, in the following description of the integral arrangement of the liquid crystal held by the glass substrates 16A and 16B, the transparent electrodes 16AB and 16BA corresponding to the liquid crystal, and the voltage dividing resistors RD1 and RD2, it will be appropriately referred to as an A liquid crystal 40. Likewise, the integral arrangement of the liquid crystal held by the glass substrates 16B and 16C, the transparent electrodes 16BB and 16CA corresponding to the liquid crystal, and the voltage dividing resistors RD3 and RD4 will be described by being appropriately referred to as a B liquid crystal 41.

Figure 6:
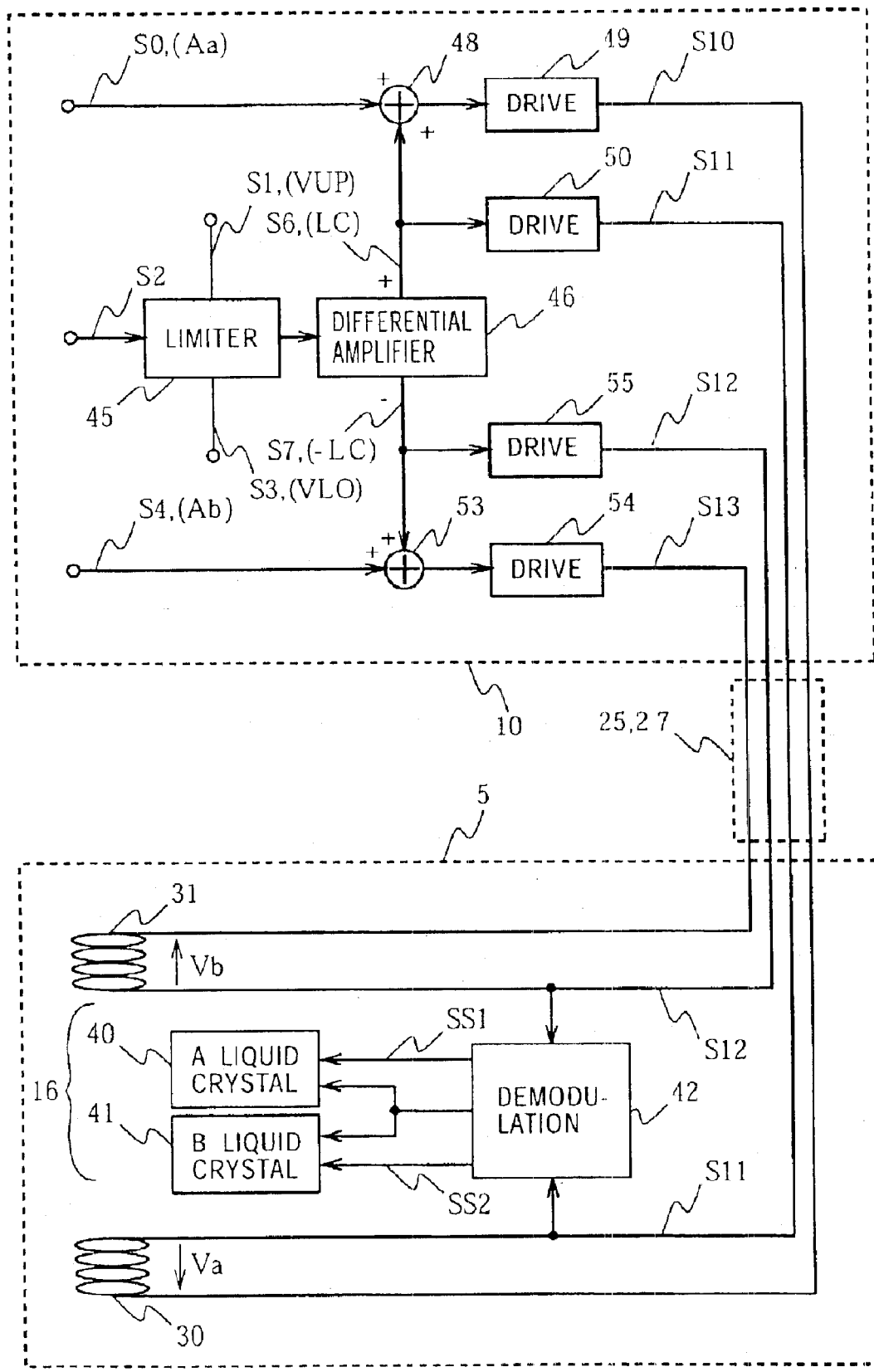
FIG. 6 is a block diagram showing a transmission unit and an optical pickup applied to the optical disc apparatus of FIG. 1.
Figure 7:
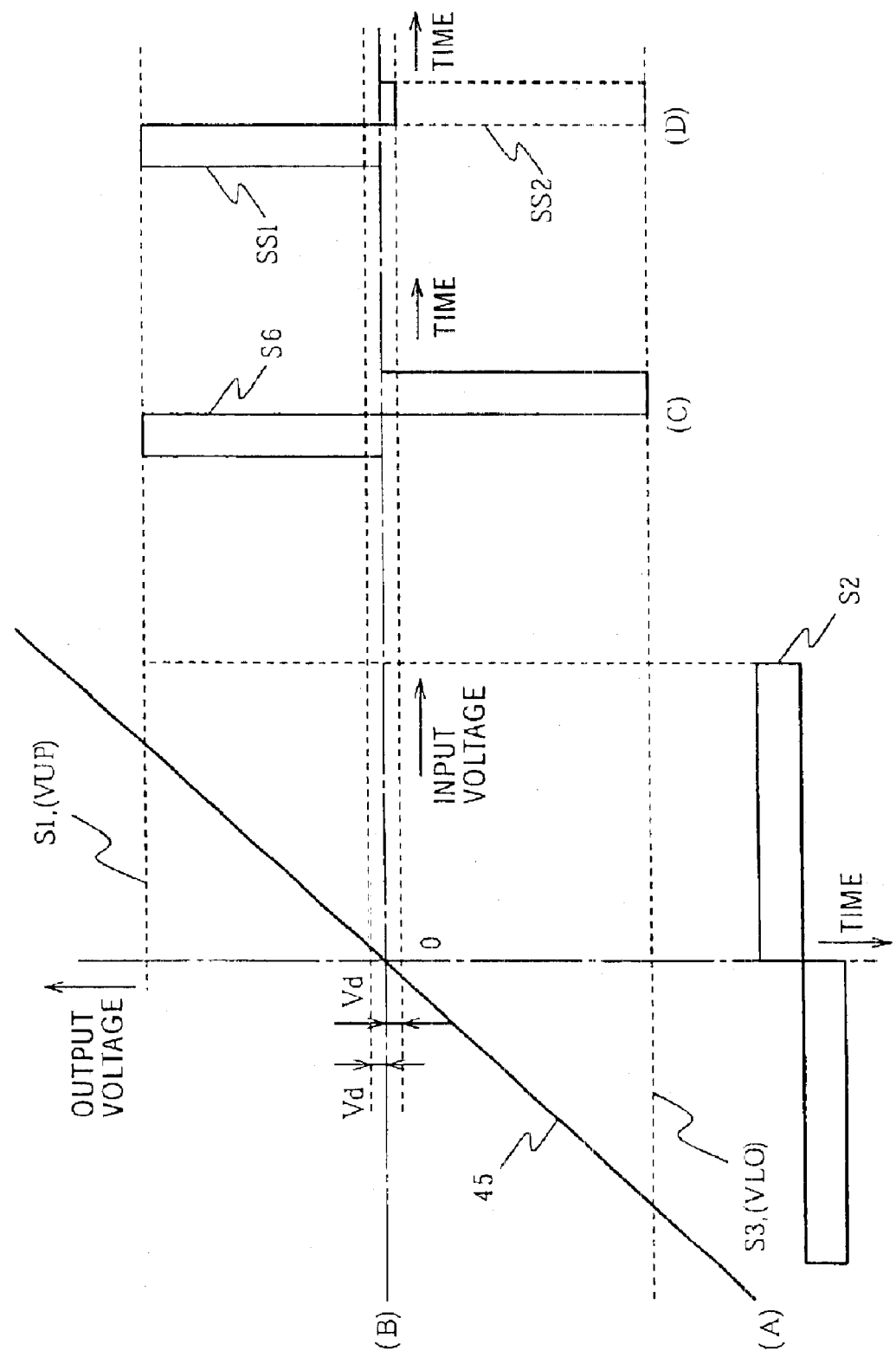
FIG. 7 is a signal waveform diagram explaining the transmission of drive signals.

FIG. 6 is a block diagram showing the demodulation circuit 42 for creating these drive signals SS1 and SS2 together with a relating arrangement. In the transmission unit 10 of the optical disc apparatus 1, as shown in FIG. 7, a limiter 45 outputs the rectangular wave signal S2 (FIG. 7(A)) after it has limited the positive and negative side amplitude values thereof by the signal levels VUP and VLO of the drive signals S1 and S3 of the aberration correction mechanism 16 (FIGS. 7(B) and (C)). Note that, in FIG. 7, Vd denotes the turned-ON voltages of the diodes D1 and D2 disposed to the demodulation circuit 42 that will be described later.

A differential amplifier 46, which is a differentially amplifying circuit having a negative differential input terminal kept to a constant voltage, receives the output signal of the limiter 45 at a positive differential input terminal and differentially amplifies it and outputs a same phase output S6 having a phase which is the same as that of the input terminal and an opposite phase output S7 having a phase which is opposite to that of the input terminal.

An addition circuit 48 adds the same phase output S6 to the tracking control drive signal S0, which is one of the drive signals of the actuator, and outputs the resultant signal. Drive circuits 49 and 50 output the output signal of the addition circuit 48 and the same phase output S6 by amplifying them by a predetermined gain, respectively. In the optical disc apparatus 1, a pair of the output signals S10 and S11 obtained as described above are introduced to the optical pickup 5 through a pair of lines and further transmitted to the subject to be moved by the actuator 21 through a pair of lines formed by each two sets of terminals 27 and suspensions 25 of each four sets of the terminals 27 and the suspensions 25 described above. Thus, in the optical disc apparatus 1, the pair of lines for transmitting the tracking control drive signal S0 are commonly biased according to the drive signal S1 of the aberration correction mechanism 16, thereby the tracking control drive signal S0 and the drive signal S2 of the aberration correction mechanism 16 are transmitted by being multiplexed.

Likewise, an addition circuit 53 adds the opposite phase output S7 supplied from the differential amplifier 46 to the focus control drive signal S4, which is the remaining one of the drive signals of the actuator and outputs the resultant signal. Drive circuits 54 and 55 amplify the output signal of the addition circuit 53 and the opposite phase signal S7 by a predetermined gain, respectively and outputs them. In the optical disc apparatus 1, a pair of the output signals S12 and S13 obtained as described above are also introduced to the optical pickup 5 through a pair of lines and further transmitted to the subject to be moved by the actuator 21 through a pair of lines formed by each two sets of the remaining terminals 27 and the remaining suspensions 25 of each four sets of the terminals 27 and the suspensions 25 described above. Thus, in the optical disc apparatus 1, the pair of lines for transmitting the focus control drive signal S4 are commonly biased according to the drive signal S3 of the aberration correction mechanism 16, thereby the focus control drive signal S4 and the drive signal S3 of the aberration correction mechanism 16 are transmitted by being multiplexed.

Further, the signals used for the bias are created by inverting the polarity of the rectangular wave signal S2 having the duty ratio of 50[%] after the positive and negative side amplitude values thereof have been limited by the signal levels of the drive signals S1 and S3, respectively. Thus, when the drive signals S1 and S3 are transmitted by biasing the two pairs of the lines as described above, these drive signals S1 and S3 can be demodulated without reproducing a bias reference level on the subject to which the signals are transmitted. Thus, in the optical disc apparatus 1, even if the aberration correction mechanism 16 is held integrally with the objective lens 17 and moved, the drive signals of the aberration correction mechanism 16 can be transmitted without increasing the number of the transmission paths, thereby the size and weight of the optical pickup 5 can be reduced, and further the deterioration of various characteristics caused by an increase in the number of the lines can be effectively avoided.

With this arrangement, in the optical pickup 5, the thus obtained drive signals S10–S13 are received once by the flexible wiring substrate 39 described above, and the lines of the drive signals S10 and S11 and the drive signals S12 and S13 of these drive signals are connected to the tracking coils 30 and the focus coils 31 corresponding thereto, respectively. Therefore, tracking and focus control is executed by driving the tracking coils 30 and the focus coils 31 by the common mode of the drive signals S10 and S11 and the common mode of the drive signals S12 and S13.

That is, when the signal levels of the same phase output S6 and the opposite phase output S7 are set to Lc and –Lc, respectively and the signal levels of the drive signals S0 and S4 are set to Aa and Ab, the signal levels of the drive signals S10 and S11 are shown by And +Lc and Lc, respectively, whereas the signal levels of the drive signals S12 and S13 are shown by –Lc and Ab–Liquid crystal, respectively. Accordingly, since the difference of potentials Va at both the ends of each tracking coil 30 is shown by S10–S11=(Aa+Lc)–Le, eventually the tracking coils 30 can be driven by the signal level of the drive signal S0. Likewise, since the difference of potentials Vb at both the ends of each focus coil 31 is shown by S12–S13=(–Lc)–(Ab–Lc), eventually the focus coils 31 can be driven by the signal level of the drive signal S4.

Figure 8:
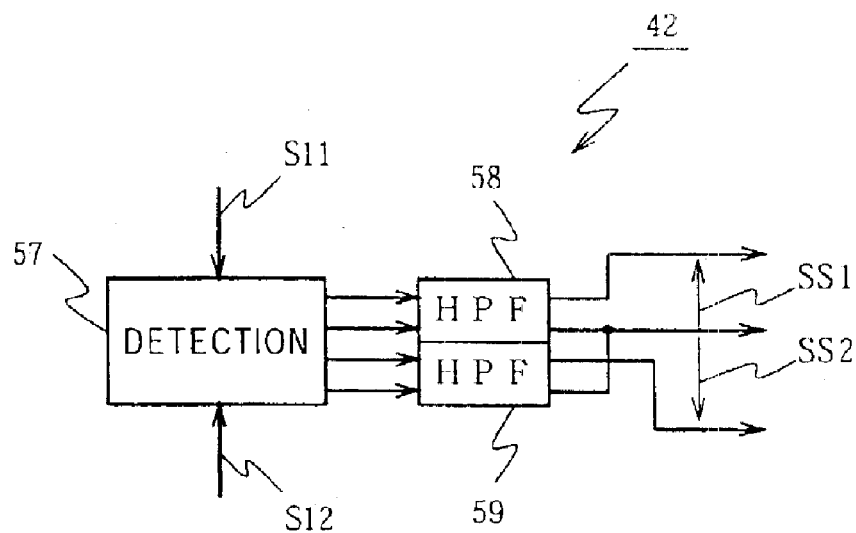
FIG. 8 is a block diagram showing a demodulation circuit of FIG. 6.

The demodulation circuit 42 creates the drive signals SS1 and SS2 of the A liquid crystal 40 and the B liquid crystal 41 by biasing these lines. That is, as shown in FIG. 8, the demodulation circuit 42 supplies the drive signals S11 and S12 of the drive signals S10–S13 on the side where they are simply biased by the same phase component S6 and the opposite phase component S7 to a detection circuit 57. Here, the difference of potentials between the drive signals S11 and S12 corresponds to a signal level whose amplitude value is limited by the drive signal S1 on one hand during a period in which the signal level of the rectangular wave signal S2 rises up, whereas it corresponds to a signal level whose amplitude value is limited by the drive signal S2 on the other hand during a period in which the signal level of the rectangular wave signal S2 falls down, thereby the signal levels of the drive signals S11 and S12 are shown in correspondence to the rising-up and the falling-down of the signal level.

Based on this principle, the demodulation circuit 42 detects the drive signals S11 and S12 through the detection circuit 57 to thereby create a positive and negative detected signals having peak values corresponding to the positive and negative limited values in the limiter 45. Further, direct current levels are cut by subsequent high-pass filters (HPF) 58 and 59 to thereby create the drive signals SS1 and SS2 of the A liquid crystal 40 and B liquid crystal 41, respectively.

Figure 9:
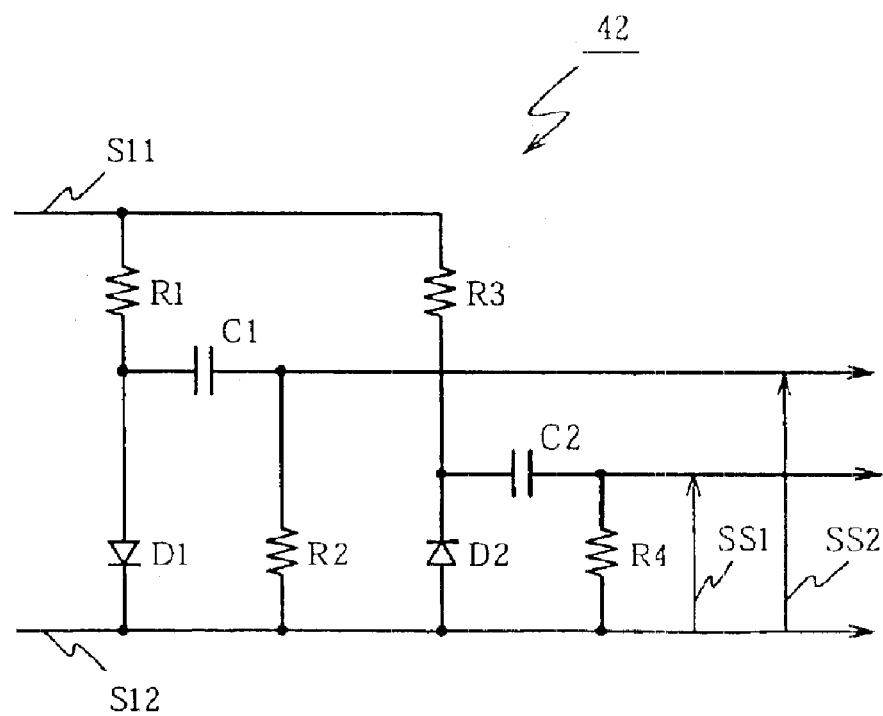
FIG. 9 is a connection diagram showing the demodulation circuit of FIG. 8 in detail.

Specifically, as shown in FIG. 9, the demodulation circuit 42 is composed of only passive elements that do not need a power supply. Thus, in the optical pickup 5, when the drive signals S0–S4 are transmitted by being multiplexed, the drive signals SS1 and SS2 can be separated without supplying power.

That is, the demodulation circuit 42 applies the drive signals S11 and S12 to both the ends of a series circuit of a resistor R1 and a diode D1 and composes a first detection circuit for detecting the drive signal of the B liquid crystal 41 of the series circuit of the resistor R1 and the diode D1 (FIG. 7(D)). Further, the drive signals S11 and S12 are applied to both the ends of a series circuit of a diode D2 and a resistor R2 with the diode D2 connected in an opposite direction, and a second detection circuit for detecting the drive signal of the A liquid crystal 40 is composed of the series circuit of the resistor R3 and the diode D2.

Further, the demodulation circuit 42 composes the high-pass filter 59 of a capacitor C1 and a resistor R2, whereas it composes the high-pass filter 58 of a capacitor C2 and a resistor R4.

(1-2) Operation of First-Embodiment

With the above arrangement, in the optical disc apparatus 1 (FIGS. 1 and 6), the quantity of light of the laser beam L1 projected from optical pickup 5 is intermittently activated, thereby desired data is recorded on the optical disc 2. Further, the result of the received return light detected by the optical pickup 5 is processed by the matrix circuit 6 and the reproduced signal RF is obtained. Then, the data recorded on the optical disc 2 is reproduced by subjecting the reproduced signal RF to signal processing.

In the optical disc apparatus 1 that accesses the optical disc 2 as described above, the quantity of jitter is detected by the jitter detection circuit 7 using the reproduced signal RF of an emboss pit or a record mark that is accessed just after the optical disc 2 is loaded, and the quantity of correction of aberration is calculated by the controller 8 based on the result of detection of the jitter. Further, a pair of the drive signals S1 and S3 each having a predetermined signal level are created based on the quantity of correction.

Further, in the optical disc apparatus 1, the tracking and focus control drive signals S0 and S4 are created by the servo circuit 4 based on the tracking and focus error signals TE and FE. In the optical disc apparatus 1, these drive signals S0–S4 are multiplexed in the transmission unit 10 and transmitted to the optical pickup 5. These multiplied signals are separated on the side of the subject to be moved by the actuator 21, thereby the actuator 21 the aberration correction mechanism 16 are driven.

Thus, the optical disc apparatus 1 can supply these signals to the subject to which the optical pickup 5 is moved through the paths as many as conventional paths for transmitting tracking and focus control drive signals by supplying these signals after they have been multiplexed and by separating and processing them on the side of the subject to be moved by the actuator 21. Accordingly, in the optical pickup 5, the objective lens 17 and the aberration correction mechanism 16 can be integrally held and moved by the actuator 21 without providing an additional supply path of these signals, thereby the deterioration of various characteristics caused by separately holding the aberration correction mechanism 16 and the objective lens 17 can be effectively avoided. That is, integrally holding the objective lens 17 and the aberration correction mechanism 16 permits them to be moved with the optical axes thereof in coincidence with each other. Further, the individual difference among optical pickups 5 can be more reduced than a case in which the objective lens 17 and the aberration correction mechanism 16 are separately mounted. As a result, an optical pickup of high accuracy with a less quantity of dispersion can be produced.

Further, since it is not necessary to add the new signal supply line, the size and weight of the optical disc apparatus can be reduced in its entirety, thereby the deterioration of the moving characteristics of the actuator caused by the provision of the new signal supply line can be effectively avoided.

That is, in the optical disc apparatus 1, the optical pickup 5 (FIGS. 3, 4(A), and 4(B)) is arranged such that the one ends of the suspensions 25 are held by the terminals 27, respectively, which are held by the suspension base 26 acting as the secured side of the actuator 21, and the subject to be moved, which includes the objective lens 17, the aberration correction mechanism 16, and the like, is held by the other ends of the suspensions 25. Further, the magnets 33 are held on the secured side, and the tracking coils 30 and the focus coils 31 are disposed on a movable side. Thus, in the optical disc apparatus 1, the objective lens 17 and the aberration correction mechanism 16 are moved integrally, thereby the occurrence of coma aberration and the like can be effectively avoided.

Further, in the aberration correction mechanism 16 arranged as described above (FIG. 5), the glass substrates 16A, 16B, and 16C, on which the electrodes are formed, are laminated with the liquid crystals sandwiched therebetween, the central glass substrate 16B is formed in the large size, and the flexible wiring substrate 39 is disposed on the enlarged portion of the aberration correction mechanism 16. In the optical pickup 5, the demodulation circuit 42 for separating the multiplexed drive signals is disposed on the flexible wiring substrate 39 and further utilized as a lead wire processing section of the tracking coil 30 and the focus coil 31. Thus, in the optical disc apparatus 1, the demodulation circuit 42 is disposed making effectively use of the limited space of the optical pickup 5, and further the connecting job and the like of the tracking coils 30 and the focus coils 31 can be simplified.

The drive signals S0–S4 are transmitted by being multiplexed as described above. Thus, in the optical disc apparatus 1 (FIG. 6), the rectangular wave signal S2 having the sufficient amplitude and the duty ratio of [50%] is created by the rectangular wave signal creation circuit 9, and the positive and negative amplitudes of the rectangular wave signal is limited by the drive signals S1 and S3 of the aberration correction mechanism 16 in the limiter 45, respectively. Further, the differential amplifier 46 creates the same phase output S6 having the same phase as that of the output signal from the limiter 45 and the opposite phase output S7 having the phase opposite to that of the output signal therefrom.

In the optical disc apparatus 1, the pair of lines for transmitting the tracking control drive signal S0 through the addition circuit 48 and the drive circuits 49 and 50 are commonly biased by the same phase output S6, thereby the one drive signal S1 of the aberration correction mechanism 16 is transmitted after it has been multiplied with the tracking control drive signal S0. Likewise, the pair of lines for transmitting the focus control drive signal S4 through the addition circuit 53 and the drive circuits 54 and 55 are commonly biased by the opposite phase output S7, thereby the remaining one drive signal S3 of the aberration correction mechanism 16 is transmitted after it has been multiplied with the focus control drive signal S4.

Thus, in the optical disc apparatus 1, these lines are introduced to the flexible wiring substrate 39 through the terminals 27 and the suspensions 25, and the respective ones of the commonly biased lines are connected to the tracking coils 30 and to the focus coil 31 corresponding thereto. Accordingly, the tracking coils 30 and the focus coils 31 can be driven by the tracking and focus control drive signals S0 and S4, respectively without being influenced by the drive signals S1 and S3 of the aberration correction mechanism 16 at all.

In contrast, in the optical disc apparatus 1, the differences of potentials between the lines simply biased by the same phase output S6 and the opposite phase output S7 are detected by the first and second detection circuits of the demodulation circuit 42 (FIGS. 8 and 9) in which the diodes D1 and D2 are disposed in the opposite direction, thereby the positive and negative side amplitude values set by the limiter 45 are reproduced. Further the direct current levels are cut by the high-pass filter circuits, and the A and B liquid crystals 40 and 41 are driven by the outputs from the high-pass filter circuits, respectively, thereby aberration can be corrected by correcting the wavefront of the laser beam L1 passing through the A and B liquid crystals 40 and 41.

(1-3) Advantage of First Embodiment

According to the above arrangement, the optical pickup can be simplified and miniaturized and further the deterioration of the various characteristics can be prevented even if the aberration correction mechanism is composed of the liquid crystals and the like by transmitting the drive signals of the actuator and the drive signals of the aberration correction mechanism by multiplexing them.

That is, the objective lens and the aberration correction mechanism can be moved with the optical axes thereof in coincidence with each other by integrally holding them, thereby the deterioration of the characteristics caused by the occurrence of coma aberration and the like can be prevented. Further, the individual difference between respective sets of the objective lenses and the aberration correction mechanisms can be more reduced than the case in which the objective lens and the aberration correction mechanism are mounted separately, thereby an optical pickup having a high accuracy and a less quantity of dispersion can be produced. Further, a requirement for a high speed response can be satisfied by reducing the size and weight of the pickup. Further, since a spring constant can be suppressed to a minimum necessary limit from the view point of the actuator by preventing an increase in the number of the transmission lines, a sufficient sensibility (voltage versus moving force) can be obtained even if the actuator has the small number of turns.

Further, a significant increase in the weight of the subject to be moved can be prevented in the optical pickup by correcting the wavefront of the laser beam by the aberration correction mechanism composed of the liquid crystals, thereby the size and weight of the optical pickup can be reduced.

Further, in the actuator, since the subject to be moved is movably held by the suspensions composed of the springs and the transmission signal is supplied to the subject to be moved through the springs, an overall arrangement can be simplified by using the holding members of the subject to be moved also as the transmission paths of the signals. Further, as described above the drive signals of the actuator and the drive signals of the aberration correction mechanism are actually transmitted through the two sets of the suspensions for the tracking control and the focus control, thereby these signals can be transmitted by the four suspensions in total. Thus, balance to skew can be optimumly maintained.

Further, the pair of lines for transmitting the drive signals of the actuator are commonly biased by the rectangular wave signal whose amplitude has been limited by the drive signals of the aberration correction mechanism to thereby multiplex the drive signals of the actuator with the drive signals of the aberration correction mechanism. Accordingly, these drive signals can be separated by a simple arrangement without providing an active element, which can also reduce the size and weight of the optical pickup.

That is, the drive signals can be separated by the simple circuit arrangement composed of only the passive elements by separating the drive signals of the aberration correction mechanism by detecting the bias common to the pair of lines by the detection circuit on the demodulation side.

That is, it can be omitted to provide a power supply necessary when an active element is utilized by forming the demodulation circuit of only the passive elements, which can also simplify the arrangement of the optical pickup and reduce the size thereof.

Specifically, the demodulation circuit can be simply arranged by composing the detection circuit of the diode detection circuits.

(2) Second Embodiment

Figure 10:
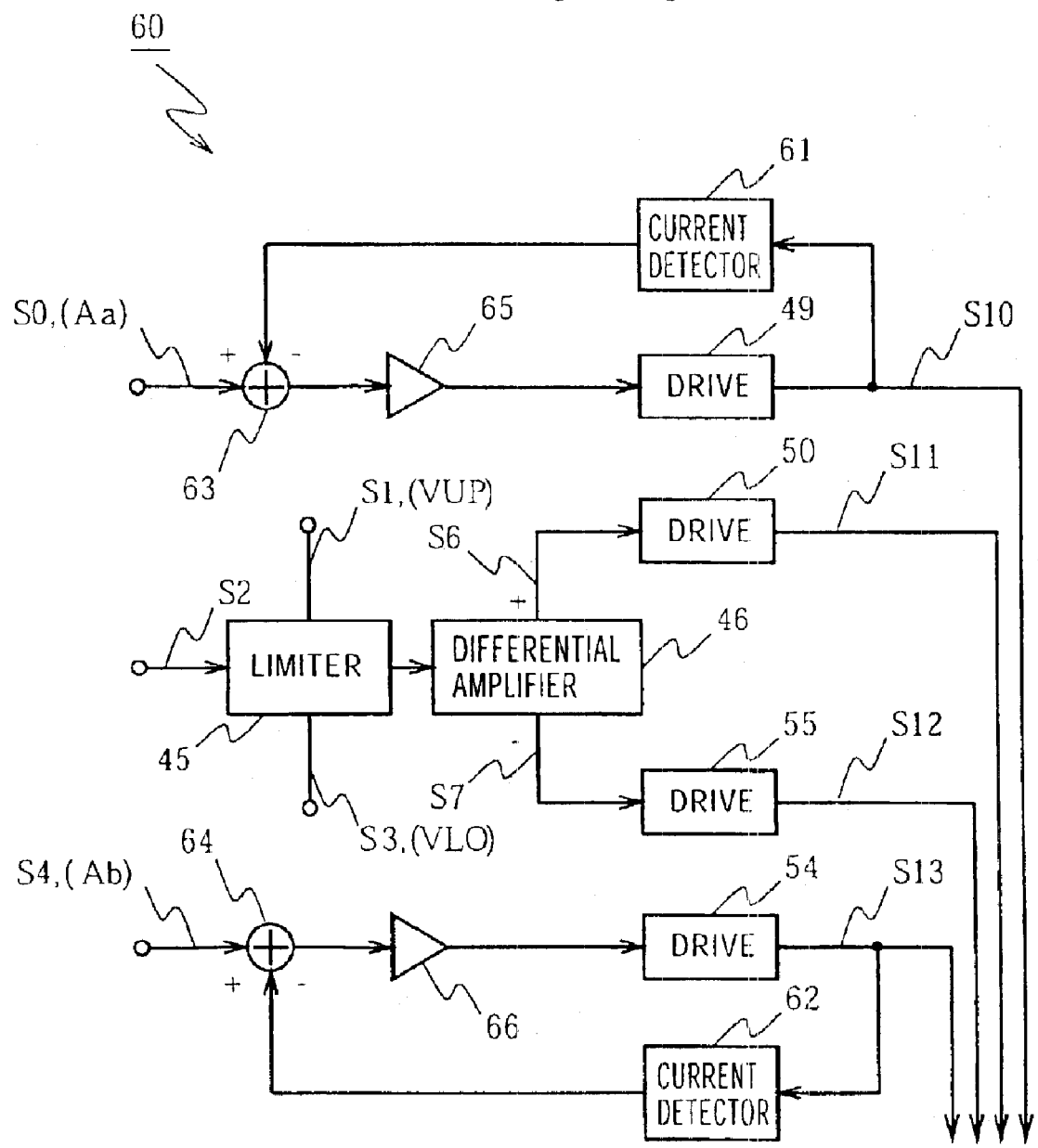
FIG. 10 is a block diagram showing a transmission unit applied to an optical disc apparatus according to a second embodiment of the present invention.

FIG. 10 is a block diagram showing a transmission unit applied to an optical disc apparatus according to a second embodiment of the present invention. The optical disc apparatus according to the embodiment is arranged similarly to that according to the first embodiment expect that the transmission unit 60 has a different arrangement. The components of the transmission unit 60 that are the same as those of the transmission unit 10 of the optical disc apparatus 1 are denoted by corresponding reference numerals and the duplicate description thereof is omitted.

In the transmission unit 60, a same phase output S6 and an opposite phase output S7 of a differential amplifier 46 are supplied only to drive circuits 50 and 55, respectively. Further, in the transmission unit 60, currents flowing through a tracking coil and a focus coil are detected by current detectors 61 and 62, and current detection signals whose signal levels change according to the respective current values are supplied. After the transmission unit 60 corrects the signal levels of drive signals S0 and S4 by corresponding current detection signals through subtraction circuits 63 and 64, it supplies the drive signals S0 and S4 to drive circuits 49 and 54 through amplifier circuits 65 and 66, respectively.

Thus, in the transmission unit 60, even if an actuator 21 is driven by current feed-back and the same phase output S6 and the opposite phase output S7 are supplied to only one pair of lines of the respective pairs of lines, respectively, respective pairs of lines are commonly biased. Accordingly, the tracking coil 30 and the focus coil 31 can be certainly driven by the drive signals S0 and S4.

As shown in FIG. 10, even if the actuator 21 is driven by the current feed-back and the same phase output S6 and the opposite phase output S7 are supplied only to the one pair of lines of the respective pairs of lines, respectively, the same advantage as that of the first embodiment can be obtained.

(3) Third Embodiment

Figure 11:
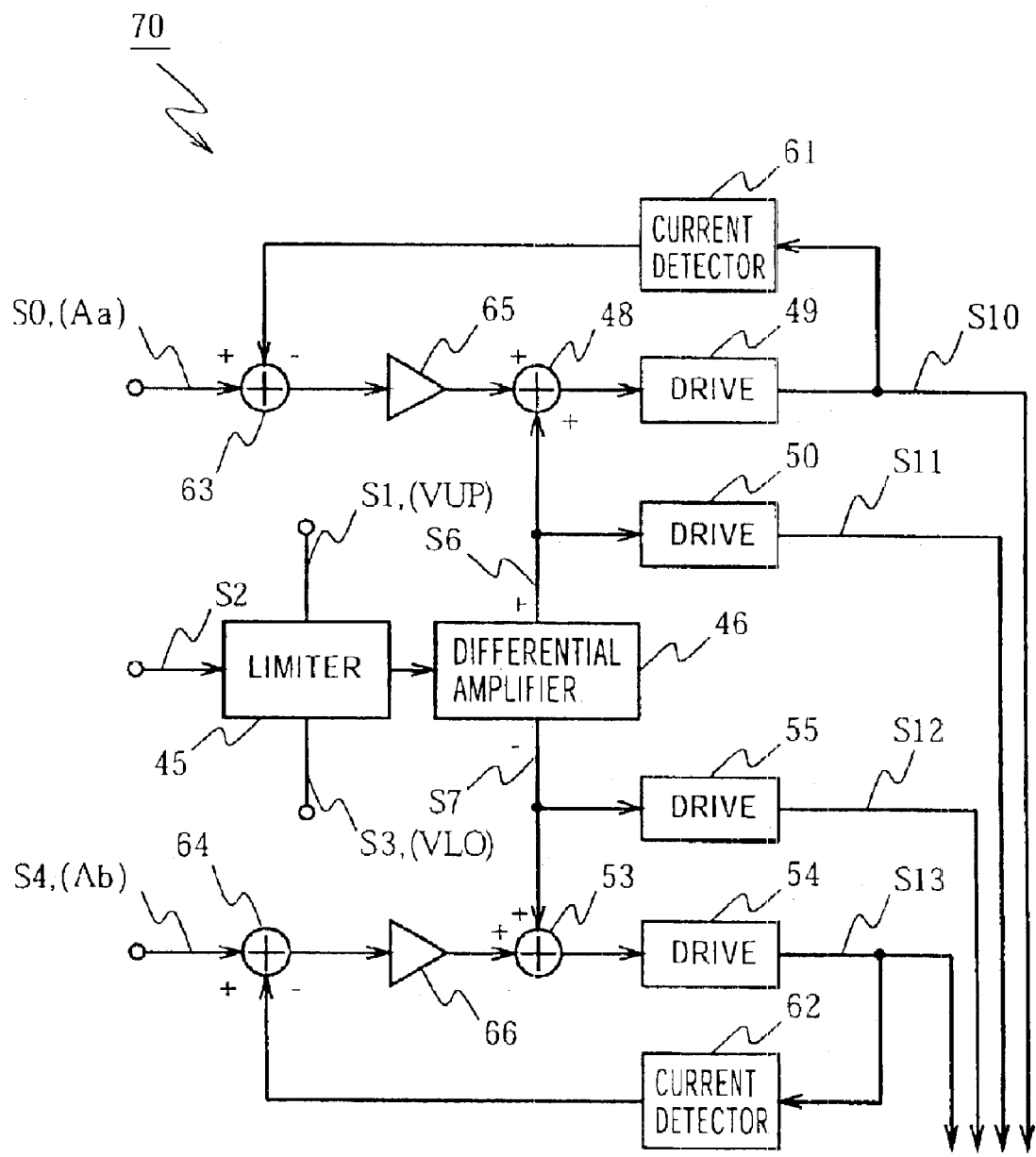
FIG. 11 is a block diagram showing a transmission unit applied to an optical disc apparatus according to a third embodiment of the present invention.

FIG. 11 is a block diagram showing a transmission unit applied to an optical disc apparatus according to a third embodiment of the present invention. The optical disc apparatus according to the embodiment is arranged similarly to that according to the first embodiment expect that the transmission unit 70 has a different arrangement. Further, the components of the transmission unit 70 that are the same as those of the transmission units 10 and 60 described above are denoted by corresponding reference numerals and the duplicate description thereof is omitted.

In this arrangement, respective pairs of lines are commonly biased by a same phase output S6 and an opposite phase output S7 similarly to the transmission unit 10 according to the first embodiment, and further an actuator 21 is driven by current feed-back similarly to the transmission unit 60 according to the second embodiment.

As shown in FIG. 11, when the respective pairs of lines are commonly biased by the same phase output S6 and the opposite phase output S7 similarly to the transmission unit 10 according to the first embodiment and further the actuator 21 is driven by the current feed-back similarly to the transmission unit 60 according to the second embodiment, frequency characteristics can be improved when the actuator 21 is driven, in addition to the advantage of the first embodiment.

(4) Fourth Embodiment

Figure 12:
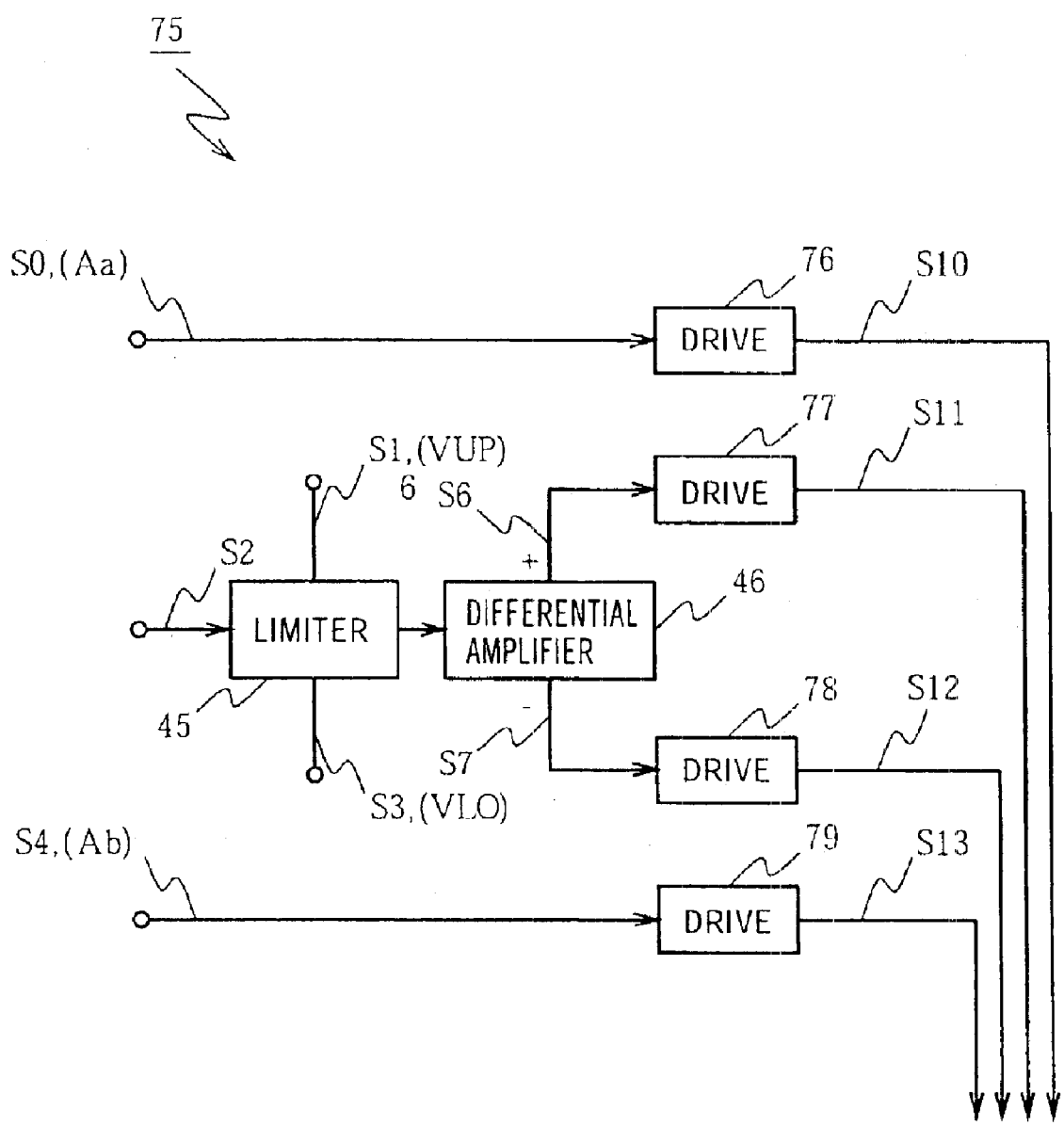
FIG. 12 is a block diagram showing a transmission unit applied to an optical disc apparatus according to a fourth embodiment of the present invention.

FIG. 12 is a block diagram showing a transmission unit applied to an optical disc apparatus according to a fourth embodiment of the present invention. The optical disc apparatus according to the embodiment is arranged similarly to that according to the first embodiment expect that the transmission unit 75 has a different arrangement. Further, the components of the transmission unit 75 that are the same as those of the transmission unit 10 described above are denoted by corresponding reference numerals and the duplicate description thereof is omitted.

In the transmission unit 75, a same phase output S6 and an opposite phase output S7 output from a differential amplifier 46 are supplied to drive circuits 77 and 78. Further, drive signals S0 and S4 are supplied to drive circuits 76 and 79. In this transmission unit 75, each of the drive circuits 76 and 79 is composed of a current output type amplifier circuit, and each of the drive circuits 77 and 78 is composed of a voltage output type amplifier circuit, thereby drive signals S0–S4 are transmitted by being multiplexed by biasing respective pairs of lines by the same phase output S6 and the opposite phase output S7, respectively, similarly to the first embodiment.

As shown in FIG. 12, even if the drive signals S0–S4 are transmitted by being multiplexed by driving the drive signals S0 and S4 by the current output type amplifier circuits and by biasing the respective pairs of lines by the same phase output S6 and the opposite phase output S7, the same advantage as that of the first embodiment can be obtained.

(5) Fifth Embodiment

Figure 13:
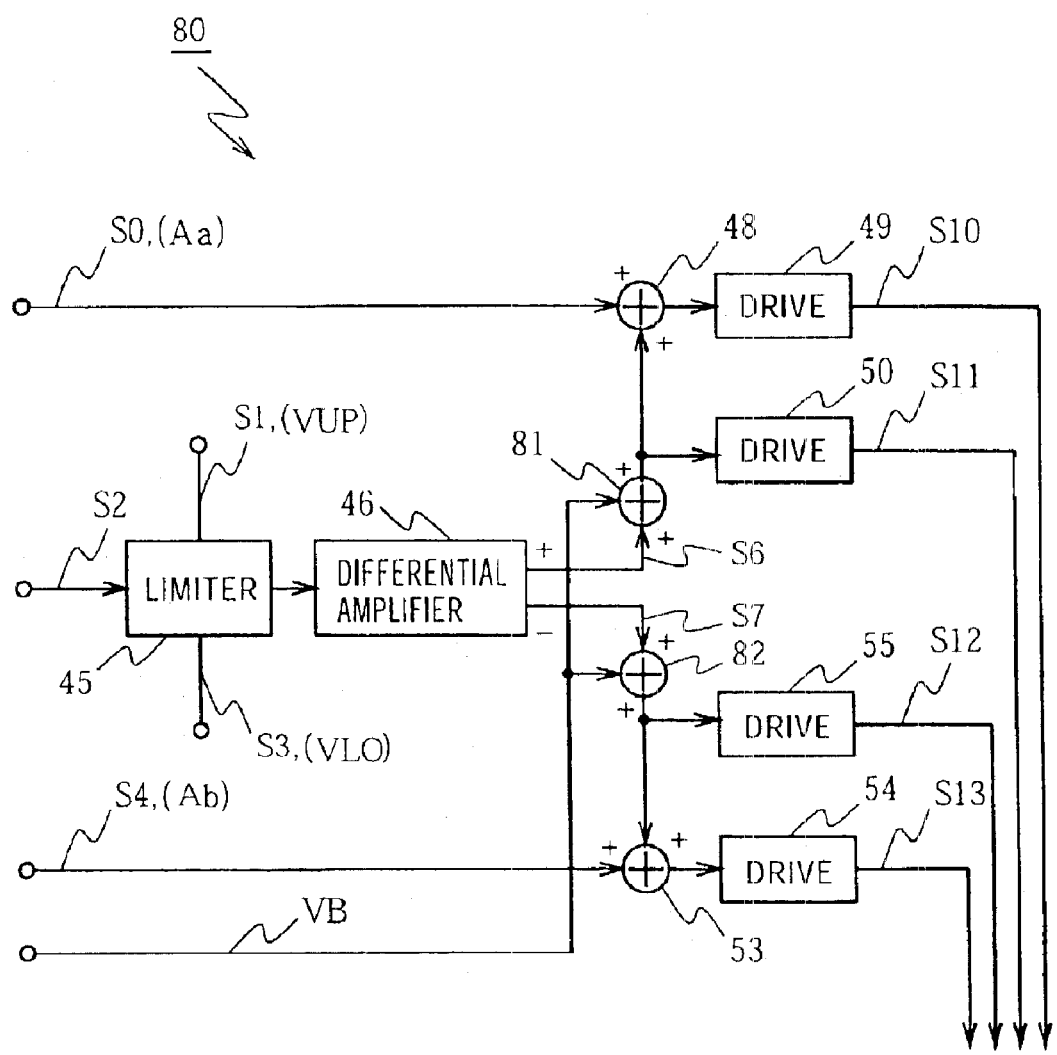
FIG. 13 is a block diagram showing a transmission unit applied to an optical disc apparatus according to a fifth embodiment of the present invention.

FIG 13 is a black diagram showing a transmission unit applied to an optical disc apparatus according to a fifth embodiment of the present invention. The optical disc apparatus according to the embodiment is arranged similarly to that according to the first embodiment except that the transmission unit 80 has a different arrangement. Further, the components of the transmission unit 80 that are the same as those of the transmission unit 10 described above are denoted by corresponding reference numerals and the duplicate description thereof is omitted.

In the transmission unit 80, a bias voltage VB is added to a same phase output S6 and an opposite phase output S7 supplied from a differential amplifier 46, respectively in addition circuits 81 and 82, and then the same phase output S6 and the opposite phase output S7 are supplied to drive circuits 49 and 50 and to drive circuits 54 and 55. Thus, in this embodiment, the drive circuits 49 and 50 and the drive circuits 54 and 55 can be composed of a single power supply.

According to the arrangement of FIG. 13, since the same phase output S6 and the opposite phase output S7 are biased and supplied to the drive circuits 49 and 50 and to the drive circuits 54 and 55, they can be composed of the single power supply, thereby an overall shape can be simplified, in addition to the advantage of the first embodiment.

(6) Sixth Embodiment

Figure 14:
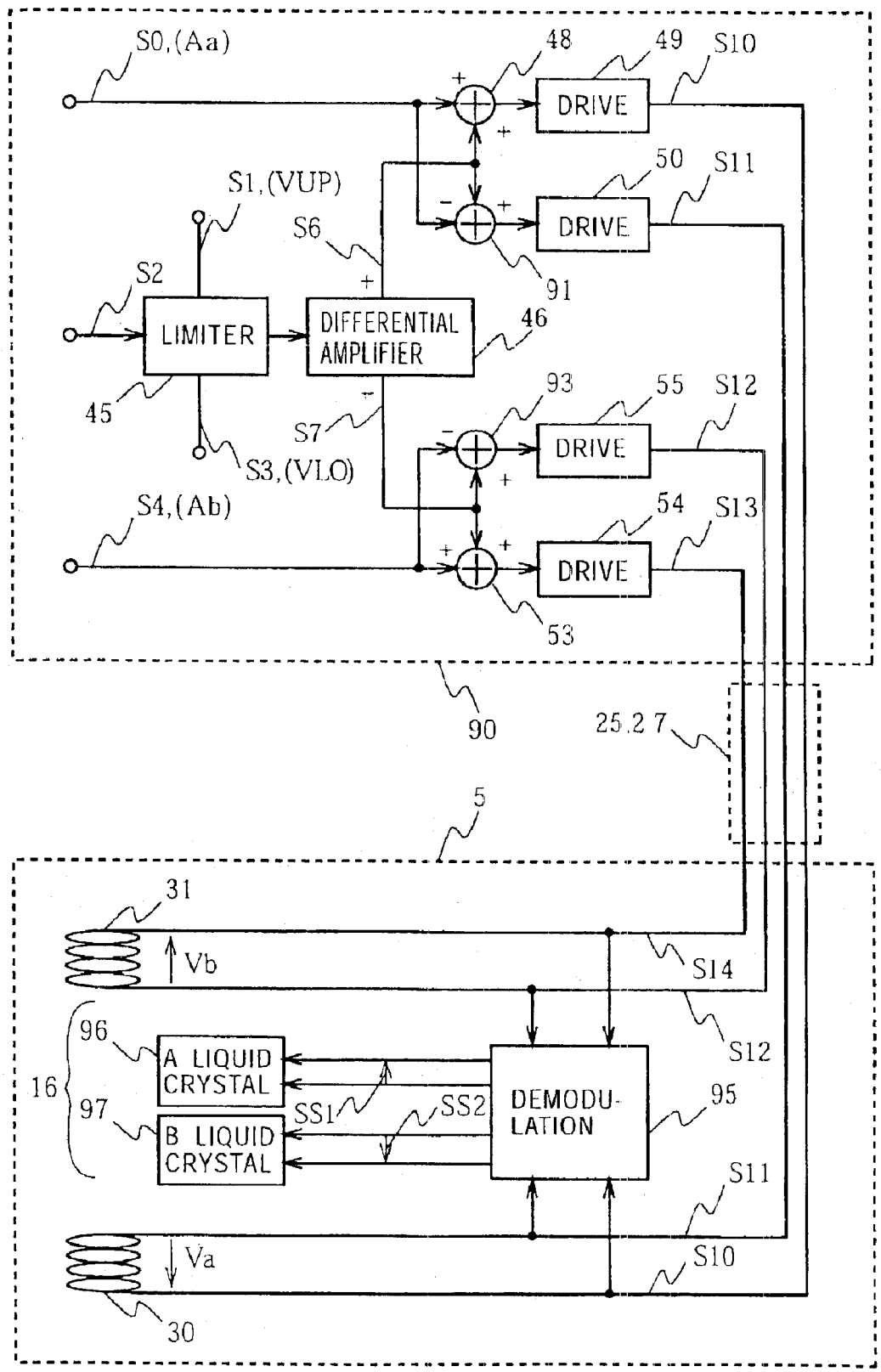
FIG. 14 is a block diagram showing a transmission unit and an optical pickup applied to an optical disc apparatus according to a sixth embodiment of the present invention.

FIG 14 is a block diagram showing a transmission unit applied to an optical disc apparatus according to a sixth embodiment of the present invention. The optical disc apparatus according to the embodiment is arranged similarly to that according to the first embodiment except that the transmission unit 90 has a different arrangement. Further, the components of the transmission unit 90 that are the same as those of the transmission unit 10 described above are denoted by corresponding reference numerals and the duplicate description thereof is omitted.

In the transmission unit 90, a drive signal S0 is added to a same phase output S6 by an addition circuit 48, and the drive signal S0 is subtracted from the same phase output S6 by a subtraction circuit 91. Thus, in the transmission unit 90, the same phase output S6 is biased to a positive side and a negative side, respectively by the drive signal S0 and supplied through drive circuits 49 and 50, respectively. Thus, in the transmission unit 90, a tracking coil 30 is driven by a differential mode, and a pair of lines driven by the differential mode is biased by the same phase output S6.

Likewise, in the transmission unit 90, a drive signal S4 is added to an opposite phase output S7 by an addition circuit 53, and the drive signal S4 is subtracted from the opposite phase output S7 by a addition circuit 93. Thus, in the transmission unit 90, the opposite phase output S7 is biased to a positive side and a negative side, respectively by the drive signal S4 and supplied through drive circuits 54 and 55, respectively. Thus, in the transmission unit 90, a focus coil 31 is driven by a differential mode, and a pair of lines driven by the differential mode is biased by the opposite phase output S7.

Thus, in this embodiment, the tracking and focus control drive signals S0 and S4 are transmitted by the differential mode, and a demodulation circuit 95 creates drive signals SS1 and SS2 for A and B liquid crystals 96 and 97 based on these drive signals S10–S13 in correspondence to the above differential mode transmission. Note that the A and B liquid crystals 96 and 97 are arranged similarly to the A and B liquid crystals 40 and 41 except that they can be driven independently because transparent electrodes formed on both the surfaces of a glass substrate 16B are insulated.

Figure 15:
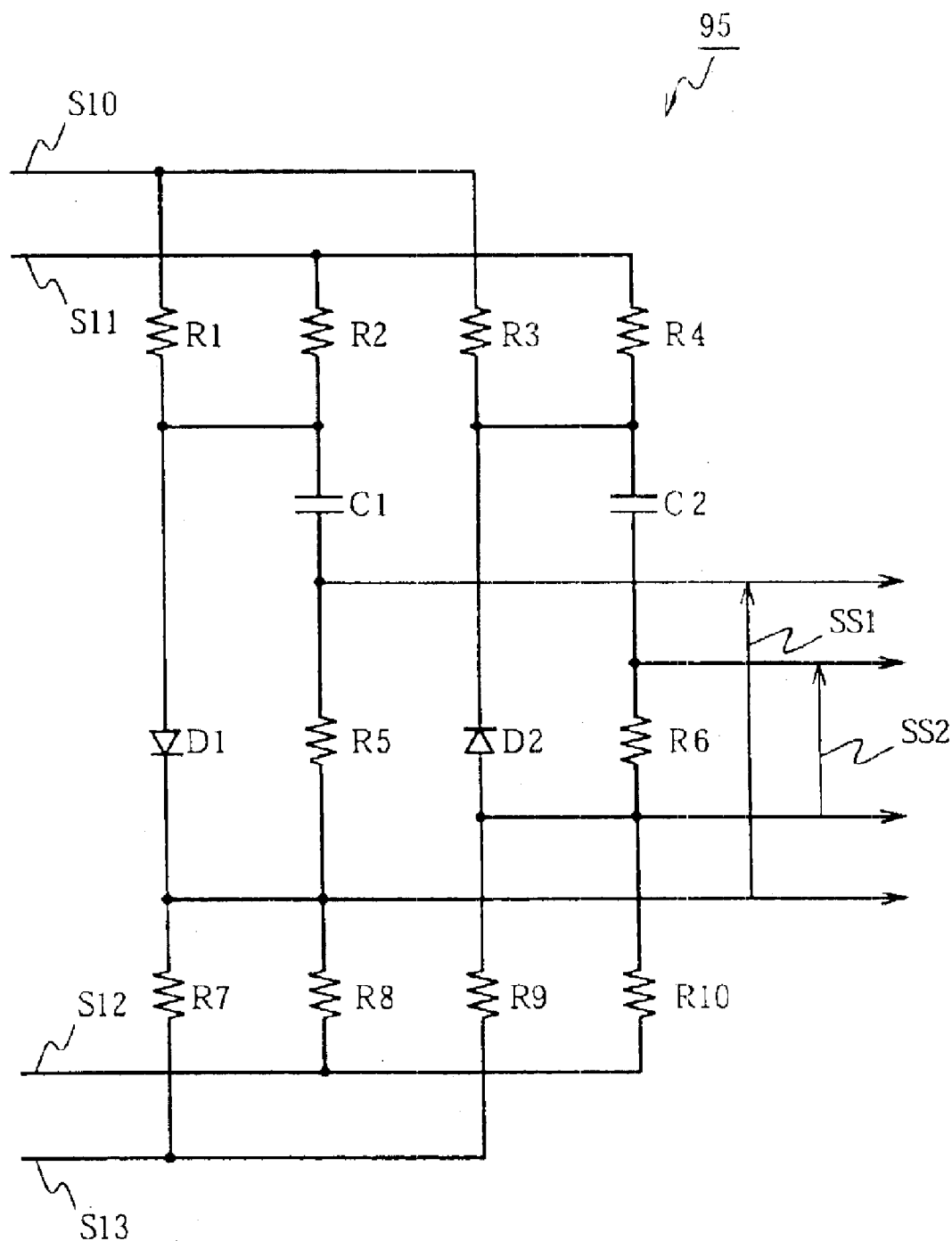
FIG. 15 is a connection diagram showing a demodulation circuit of FIG. 14.

That is, FIG. 15 is a connection diagram showing the demodulation circuit 95. In the demodulation circuit 95, the drive signals S10 and S11, which result from the differential mode transmission of the tracking control drive signal S0, is received at both the ends of a series circuit of resistors R1 and R2. Likewise, the drive signals S12 and S13, which result from the differential mode transmission of the focus control drive signal S4, is received at both the ends of a series circuit of resistors R7 and R8. These resistors R1 and R2, and R7 and R8 are set to an approximately similar resistance value, respectively, thereby the demodulation circuit 95 creates an approximately midpoint potential to the drive signals S0 and S4 transmitted by the differential mode, and the drive signals SS1 and SS2 are reproduced from the midpoint potential similarly to the demodulation circuit 42 according to the first embodiment.

The demodulation circuit 95 constitutes a detection circuit by connecting the connection midpoint of the resistors R1 and R2, the connection midpoint of the resistors 7 and 8, and a diode D1, and further constitutes a high-pass filter circuit by connecting a series circuit composed of a capacitor C1 and a resistor R5 to these midpoints. Thus, the demodulation circuit 95 supplies the outputs at both the ends of the resistor R5 as the drive signal SS1.

Likewise, the drive signals S10 and S11 are received at both the ends of a series circuit of resistors R3 and R4, and the drive signals S12 and S13 are received at both the ends of a series circuit of resistors R9 and R10. Further, a detection circuit is constructed by connecting the connection midpoint of the resistors R3 and R4, the connection midpoint of the resistors R9 and R10, and a diode D2 disposed in a direction opposite to the diode D1, and further a high-pass filter circuit is constructed by connecting a series circuit of a capacitor C2 and a resistor R6 to these midpoints. Thus, the demodulation circuit 95 supplies the outputs at both the ends of the resistor R6 as the drive signal SS2.

Even if the drive signals of an actuator are transmitted by the differential mode as in the arrangement of FIGS. 14 and 15, the same advantage as that of the first embodiment can be obtained.

(7) Seventh Embodiment

Figure 16:
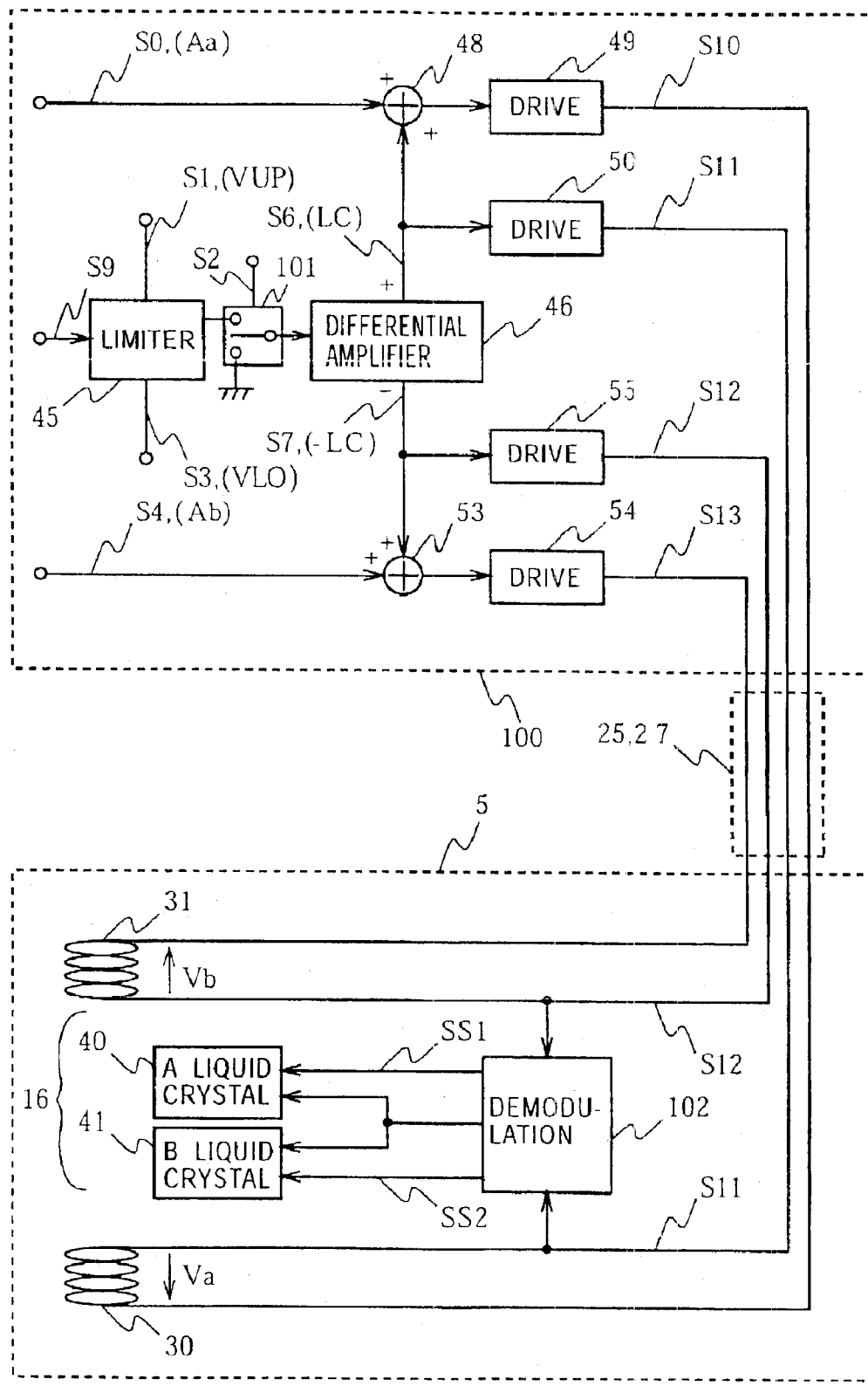
FIG. 16 is a block diagram showing a transmission unit and an optical pickup applied to an optical disc apparatus according to a seventh embodiment of the present invention.

FIG 16 is a block diagram showing a transmission unit applied to an optical disc apparatus according to a seventh embodiment of the present invention together with a peripheral arrangement in comparison with FIG 6. The optical disc apparatus according to the embodiment is arranged similarly to that according to the first embodiment except that an arrangement shown in FIG. 16 is applied. Note that, in the arrangement shown in FIG 16, the components that are the same as those described above as to the first embodiment are denoted by corresponding reference numerals and the duplicate description thereof is omitted.

In the transmission unit 100 according to this embodiment, a rectangular wave signal S9 having a frequency sufficiently higher than that of the rectangular wave signal S2 and having a duty ratio of 50[%] is supplied to a limiter 45 in place of the rectangular wave signal S2. Here, the frequency of the rectangular wave signal S9 is set to a frequency that can easily separate the band of the rectangular wave signal S2 using a simply arranged band-pass filter. Thus, in this embodiment, the amplitude of the rectangular wave signal S9 that is a burst-state signal is limited by the signal levels VUP and VLO of drive signals S1 and S3 of an aberration correction mechanism.

A multiplexer 101 is composed of a switch circuit for intermittently supplying the output signal of a limiter 45 to a differential amplifier 46 according to the signal level of the drive signal S2.

Thus, in the transmission unit 100 according to the embodiment, as shown in FIGS. 17(A) and (B), the burst-state signal whose positive and negative side amplitudes are limited by the signal levels VUP and VLO of the drive signals S1 and S3 of the aberration correction mechanism is intermittently supplied to the differential amplifier 46 by the drive signal S2 having a duty ratio of 50[%], and the intermittent burst signal is transmitted after it has been multiplexed with tracking and focus control drive signals S0 and S4. Note that FIGS. 17(A) and (B) show a signal waveform of an opposite phase output S7 supplied from the differential amplifier 46, wherein a cycle T1 shows the cycle of the rectangular wave signal S2, and a cycle T2 shows the cycle of the rectangular wave signal S9.

An optical pickup 5 demodulates the drive signals SS1 and SS2 of the aberration correction mechanism having been multiplexed and transmitted as described above through a demodulation circuit 102.

Figure 17:
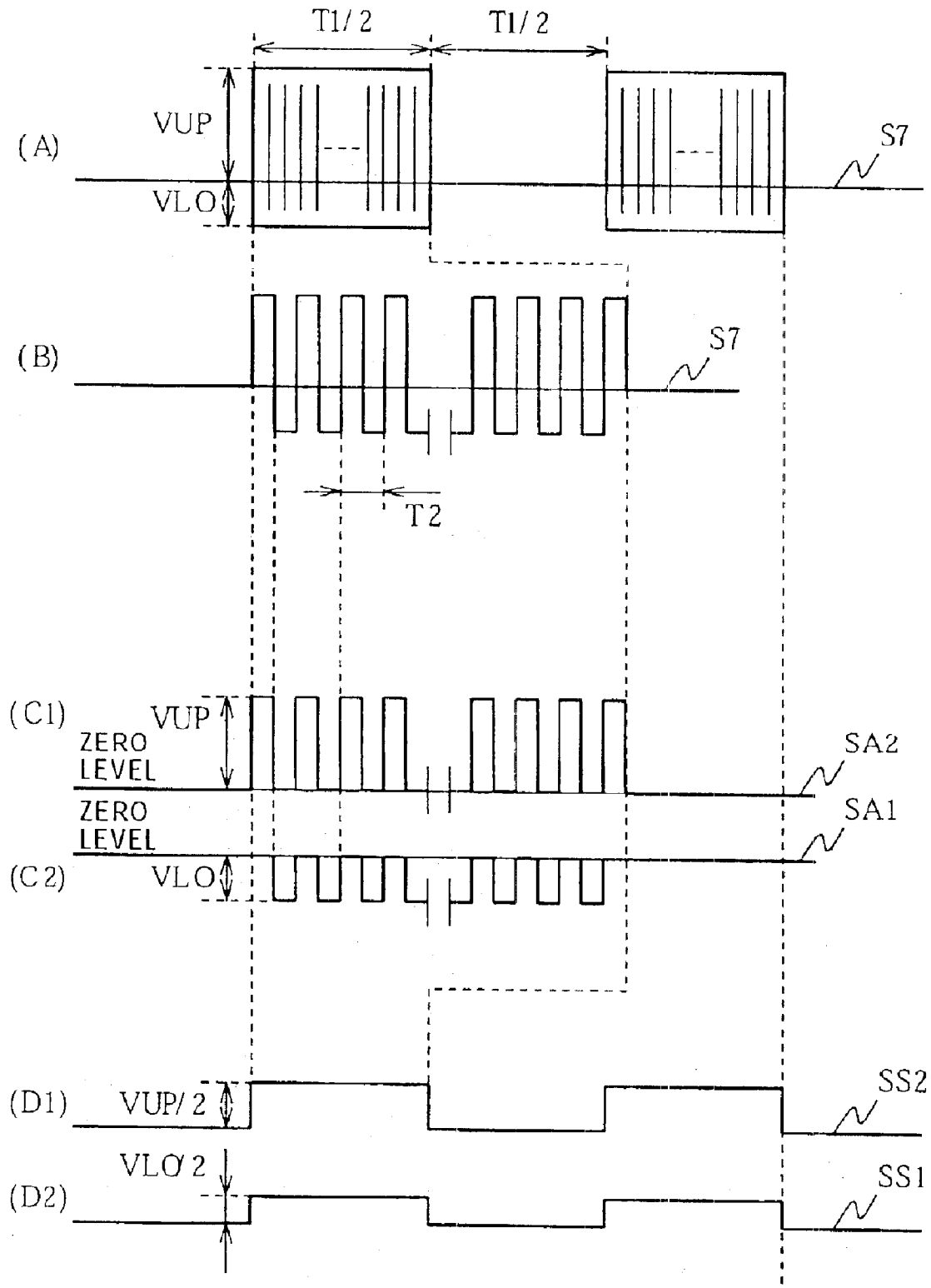
FIG. 17 is a signal waveform diagram explaining the transmission of drive signals.
Figure 18:
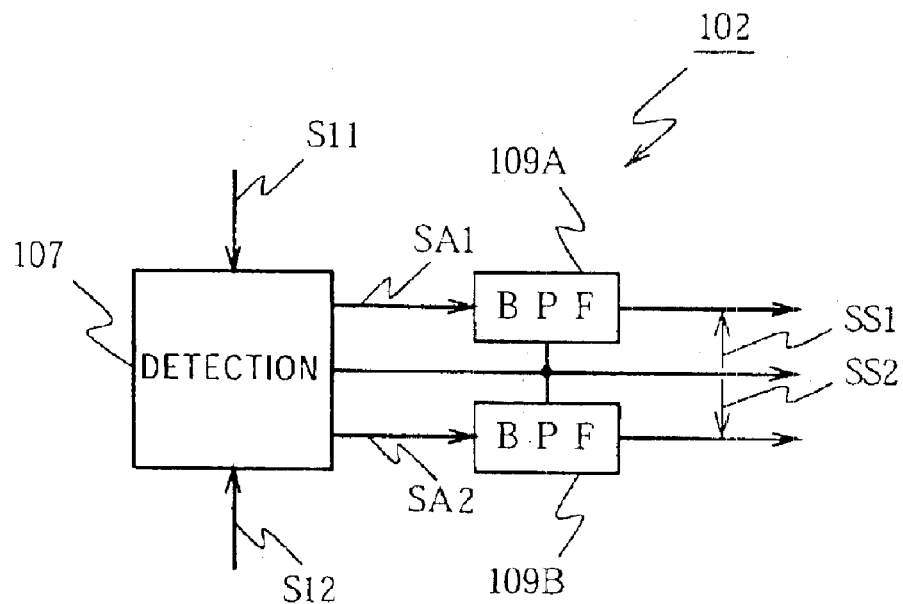
FIG. 18 is a block diagram showing a demodulation circuit of FIG. 16.

FIG. 18 is a block diagram showing the demodulation circuit 102. The demodulation circuit 102 supplies the drive signals S11 and S12 of drive signals S10–S13 on the side where they are simply biased by a same phase component S6 and an opposite phase component S7 to a detection circuit 107, and positive and negative side detection signals SA1 and SA2 that have peak values corresponding to the positive and negative side limit values in the limiter 45 are created by the detection circuit 107 (FIGS. 17(C2) and (C1)).

Further, the signal component of the rectangular wave drive signal S9 is removed from the positive and negative side detection signals SA1 and SA2 by subsequent band-pass filters (BPF) 109A and 109B to thereby create drive signals SS1 and SS2 (FIGS. 17(D2) and (D1)).

Figure 19:
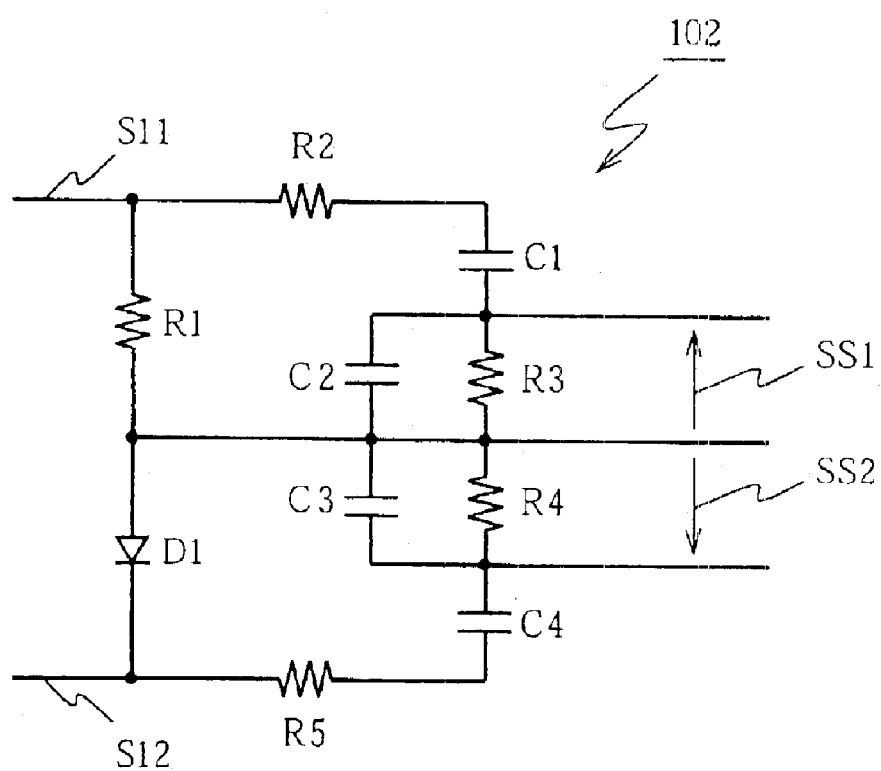
FIG. 19 is a connection diagram showing the demodulation circuit of FIG. 18 in detail.

FIG. 19 is a connection diagram showing a specific arrangement of the demodulation circuit 102. In the demodulation circuit 102, the detection circuit 107 is composed of a resistor R1 and a diode D1. Further, the band-pass filter 109A on one hand is constructed by connecting a series circuit composed of a resistor R2 and a capacitor C1 in series to a parallel circuit composed of a resistor R3 and a capacitor C2, and the band-pass filter 109B on the other hand is constructed by connecting a series circuit composed of a resistor R5 and a capacitor C4 in series to a parallel circuit composed of a resistor R4 and a capacitor C3.

According to the arrangement shown in FIG. 16, even if the drive signals of an actuator and the drive signals of the aberration correction mechanism are transmitted by being multiplexed by the superimposition of the intermittent burst-state signal, the same advantage as that of the first embodiment can be obtained.

It should be noted that when an experiment was executed by setting the frequencies of the rectangular wave signals S9 and S2 to 1 [MHz] and 225 [kHz], respectively and by setting the low and high cut-off frequencies of the band-pass filters 109A and 109B to 3.4 [kHz] and 16 [kHz], respectively, tracking and focus control could be executed with sufficient frequency characteristics and gains, and further the aberration correction mechanism could be driven.

(8) Eighth Embodiment

Figure 20:
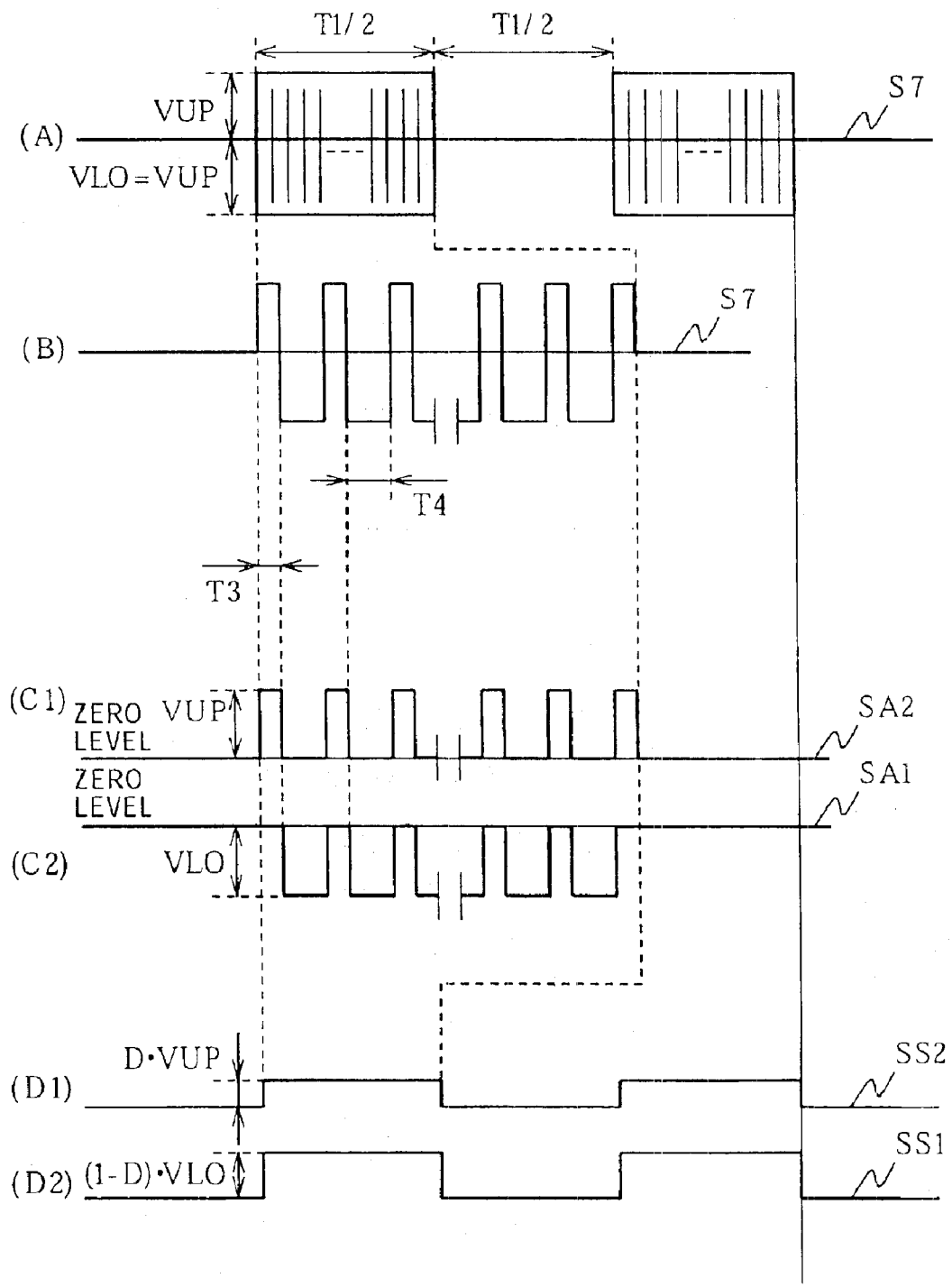
FIG. 20 is a signal waveform diagram explaining the transmission of drive signals as to a transmission unit and an optical pickup applied to an optical disc apparatus according to an eighth embodiment of the present invention.

FIG. 20 is a signal waveform diagram explaining a transmission unit applied to an optical disc apparatus according to an eighth embodiment of the present invention and an operation of an optical pickup in comparison with FIG. 17.

The optical disc apparatus according to this embodiment is arranged similarly to that of the seventh embodiment described above as to FIGS. 16 to 19 except that drive signals 11 and 12 are multiplexed by controlling the amplitude value and the duty ratio of a rectangular wave signal S9 in place of limiting the positive and negative side amplitude values thereof by a limiter 45. Thus, the optical disc apparatus of the embodiment will be described using the arrangement of FIG. 16.

In the transmission unit 100 of the optical disc apparatus, the limiter 45 supplies the rectangular wave signal S9 after the amplitude value thereof has been limited by a drive signal S1 of an aberration correction mechanism (FIGS. 20(A) and (B)). Note that, as to the limit of the amplitude value in relation to the seventh embodiment described above, a positive side amplitude value VPU is set so as to change according to the signal level of the drive signal S1, and a negative side amplitude value VLO is set so as to coincide with the positive side amplitude value VPU.

In the transmission unit 100, the duty ratio (D=T3/T2) of the rectangular wave signal S9 is set according to the signal level of a drive signal S3 with respect to the drive signal S1 of the aberration correction mechanism. That is, when the signal level of the drive signal S1 is equal to the signal level of the drive signal S3, the duty ratio of the rectangular wave signal S9 is set to 50[%]. Whereas, when the signal level of the drive signal S3 increases with respect to the signal level of the drive signal S1, the duty ratio is controlled such that a falling-down period T3 to a negative side is longer than a rising-up period T4 to a positive side, and when the signal level of the drive signal S3 decreases with respect to the signal level of the drive signal S1 on the contrary, the duty ratio is controlled such that the falling-down period T3 to the negative side is shorter than the rising-up period T4 to the positive side.

Thus, in this embodiment, when the drive signals S11 and S12 are detected by an optical pickup 5 side and the bands thereof are limited by band-pass filters 109A and 109B, drive signals SS1 and SS2, which are the same as those when the positive and negative side amplitude values of the rectangular wave signal S9 are limited, respectively in the embodiment 7, can be created (FIGS. 20(C1)–(D2)).

According to the arrangement shown in FIG. 20, the same advantage as that of the first embodiment can be obtained even if the drive signals S11 and S12 are multiplexed by controlling the amplitude value and the duty ratio of the intermittent burst-state signal so that the drive signals of an actuator and the drive signals of the aberration correction mechanism are transmitted after they have been multiplexed by the superimposition of the burst-state signal.

It should be noted that when an experiment was executed by setting the frequencies of the rectangular wave signals S9 and S2 to 1 [MHz] and 2 [kHz], respectively and by setting the low and high cut-off frequencies of the band-pass filters 109A and 109B to 3.4 [kHz] and 16 [kHz], respectively, tracking and focus control could be executed with sufficient frequency characteristics and gains, and further the aberration correction mechanism could be driven.

Note that the same advantage can be obtained even if the amplitude of the rectangular wave signal S9 is controlled by the drive signal S3 in place of the drive signal S1.

(9) Other Embodiments

It should be noted that the case, in which the demodulation circuit is composed only of the passive elements, has been described in the above embodiments. However, the present invention is not limited thereto, and the demodulation circuit may be composed of active elements as necessary. Note that, in this case, it is further contemplated to transmit power by superimposing it on a signal line and to demodulate the drive signals by various methods in place of demodulating them by the detection using the the diodes. Further, various methods can be widely applied to the multiplexing method.

Figure 21:
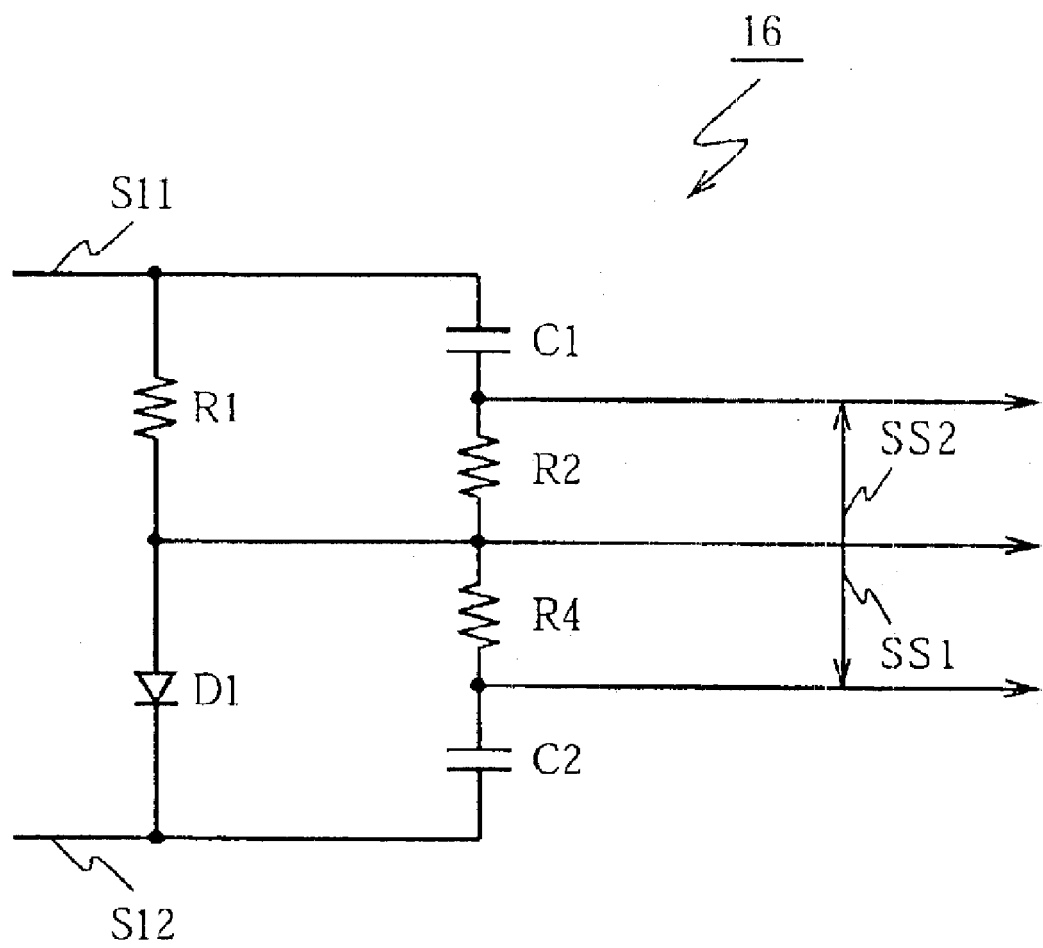
FIG. 21 is a connection diagram showing a demodulation circuit according to other embodiment.

Further,the case, in which the positive and negative side detection circuits are disposed in the demodulation circuit, respectively, has been described in the first embodiment and the like described above. However, the present invention is not limited thereto, and these detection circuits may be commonly used as shown in FIG. 21 in comparison with FIG. 9. With this manner, the arrangement can be more simplified.

Further, the case, in which the wavefront of the laser beam is corrected about a light axis in the aberration correction mechanism by forming the transparent electrodes concentrically, has been described in the above embodiments. However, the present invention is not limited thereto and can be widely applied to cases in which the wavefront is variously corrected, for example, a case in which the wavefront is corrected in the outer and inner peripheral directions of the optical disc, and like.

Further, the case, in which the aberration correction mechanism is composed of the one set of liquid crystals, has been described in the above embodiments. However, the present invention is not limited thereto and can be widely applied to a case in which the drive signals are transmitted by composing the aberration correction mechanism of an increased number of liquid crystals, and further to a case in which the drive signals are transmitted by composing the aberration correction mechanism of various correction mechanisms other than the liquid crystals, and the like.

Further, the case, in which the optical pickup is constructed by the so-called cantilever structure having the four suspensions, has been described in the above embodiments. However, the present invention is not limited thereto and can be widely applied to cases in which the optical pickup is composed of various holding mechanisms, for example, a case in which the optical system is movably held from both the sides thereof by base members disposed on both the sides of the optical system, and the like.

Further, the case, in which the transmission unit is disposed to the outside of the optical pickup of the optical disc apparatus, has been described in the above embodiments. However, the present invention is not limited thereto, and the transmission unit may be disposed to, for example, a fixed side of the optical pickup.

Further, the case, in which the drive signals of the aberration correction mechanism is created by detecting the quantity of jitter, has been described in the above embodiments. However, the present invention is not limited thereto and can be widely applied to cases in which the aberration correction mechanism is driven based on various standards, for example, a case in which the P-P value of the reproduced signal RF is detected by envelope detecting the reproduced signal RF and the aberration correction mechanism is driven by the result of detection, and the like. Further, the present invention can be widely applied to cases in which the drive signals of the aberration correction mechanism are created by various methods, for example, a case in which the drive signals are created by information previously recorded on the optical disc in place of the processing based on the result of reproduction of the optical disc as described above, and the like.

Further, the case, in which the focus and tracking control is executed by driving the focus and tracking coils similar to those of the first embodiment, has been described in the above seventh and eighth embodiments. However, the present invention is not limited thereto, and the method of driving the focus and tracking coils described as to the second to sixth embodiments can be also applied widely to a case in which multiplexing is executed by burst-state signal.

Further, the case, in which a so-called open magnet type actuator having the tracking and focus coils interposed between the confronting magnets is applied, has been described in the above embodiments. However, the present invention is not limited thereto and can be widely applied to a case in which a closed magnet type actuator having yokes disposed to the respective confronting magnets is applied.

Further, the case, in which spherical aberration caused by an error of thickness of a light transmitting layer, and the like is corrected by the aberration correction mechanism, has been described in the above embodiments. However, the present invention is not limited thereto and can be widely applied to a case in which various types of aberration such as coma aberration due to an inclined optical disc, astigmatism, and the like are corrected by the aberration correction mechanism.

Further, the case, in which the phase change type optical disc is accessed, has been described in the above embodiments. However, the present invention is not limited thereto and can be widely applied to an optical pickup and an optical disc apparatus for accessing various types of optical discs.

As described above, according to the present invention, the optical pickup can be simplified and miniaturized and further the deterioration of the various characteristics can be prevented even if the aberration correction mechanism is composed of the liquid crystals and the like by transmitting the drive signals of the actuator and the drive signals of the aberration correction mechanism by multiplexing them.

INDUSTRIAL APPLICABILITY

The present invention relates to a method of driving an optical pickup, an optical pickup, and an optical disc apparatus and can be applied to a case in which an aberration correction mechanism is composed of, for example, liquid crystals.

What is claimed is:

1. A method of driving an optical pickup for executing at least tracking control and focus control by moving an objective lens by an actuator, characterized by:

holding an aberration correction mechanism for correcting the wavefront of a laser beam incident on the objective lens integrally with the objective lens;

creating a transmission signal by multiplexing a drive signal of the actuator with a drive signal of the aberration correction mechanism by a transmission unit and transmitting the transmission signal to a subject to be moved by the actuator by the transmission unit; and separating the drive signal of the actuator and the drive signal of the aberration correction mechanism from the transmission signal in a demodulation circuit on the side of the subject to be moved, and characterized in that transmission unit multiplexes the drive signal of the actuator and the drive signal of the aberration correction mechanism by commonly biasing a pair of lines for transmitting the drive signal of the actuator by a rectangular wave signal whose amplitude is limited by the drive signal of the aberration correction mechanism.

2. A method of driving an optical pickup according to claim 1, characterized in that the aberration correction mechanism corrects the wavefront of the laser beam by a liquid crystal.

3. A method of driving an optical pickup according to claim 1, characterized in that the actuator movably holds the movable subject by a plurality of springs and transmits the transmission signal to the movable subject through the springs.

4. A method of driving an optical pickup according to claim 1, characterized in that the demodulation circuit separates the drive signal of the aberration correction mechanism by detecting a bias common to the pair of lines by a detection circuit.

5. A method of driving an optical pickup according to claim 4, characterized in that the detection circuit is a diode detection circuit.

6. A method of driving an optical pickup according to claim 1, characterized in that the demodulation circuit is composed of only passive elements.

7. A method of driving an optical pickup according to claim 1, characterized in that:
the drive signal of the aberration correction mechanism is formed of first and second drive signals;
the transmission unit multiplexes the first drive signal by limiting the positive amplitude value or the negative amplitude value of the rectangular wave signal by the first drive signal with respect to the tracking control drive signal of the actuator to thereby commonly bias the corresponding pair of lines; and
the transmission unit multiplexes the second drive signal by limiting the positive amplitude value or the negative amplitude value of the rectangular wave signal by the second drive signal with respect to the focus control drive signal of the actuator to thereby commonly bias the corresponding pair of lines.

8. An optical pickup capable of executing at least tracking control and focus control by moving an objective lens by an actuator, characterized by comprising:
an aberration correction mechanism held integrally with the objective lens for correcting the wavefront of a laser beam incident on the objective lens; and
a demodulation circuit movably held integrally with the objective lens for separating a drive signal of the actuator and a drive signal of the aberration correction mechanism from a transmission signal transmitted from a fixed side of the actuator characterized in that a transmission unit multiplexes the drive signal of the actuator and the drive signal of the aberration correction mechanism by commonly biasing a pair of lines for transmitting the drive signal of the actuator by a rectangular wave signal whose amplitude is limited by the drive signal of the aberration correction mechanism.

9. An optical pickup according to claim 8, characterized in that the aberration correction mechanism corrects the wavefront of the laser beam by a liquid crystal.

10. An optical pickup according to claim 8, characterized in that:
the actuator movably holds a movable subject by a plurality of springs; and
the demodulation circuit inputs the transmission signal through the springs.

11. An optical pickup according to claim 8, characterized in that the demodulation circuit separates the drive signal of the aberration correction mechanism by detecting a bias common to said pair of lines for transmitting the transmission signal.

12. An optical pickup according to claim 11, characterized in that the demodulation circuit is a diode detection circuit.

13. An optical pickup according to claim 8, characterized in that the demodulation circuit is composed of only passive elements.

14. An optical disc apparatus for executing at least tracking control and focus control by moving an objective lens mounted on an optical pickup by an actuator, characterized by comprising:
an aberration correction mechanism held integrally with the objective lens for correcting the wavefront of a laser beam incident on the objective lens;
a drive signal creation circuit for creating a drive signal of the actuator and a drive signal of the aberration correction mechanism;
a transmission unit for creating a transmission signal by multiplexing the drive signal of the actuator with the drive signal of the aberration correction mechanism and for transmitting the transmission signal to a movable subject side of the actuator; and
a demodulation circuit held integrally with the objective lens for separating the drive signal of the actuator and the drive signal of the aberration correction mechanism from the transmission signal, and
characterized in that the transmission unit multiplexes the drive signal of the actuator and the drive signal of the aberration correction mechanism by commonly biasing a pair of lines for transmitting the drive signal of the actuator by a rectangular wave signal whose amplitude is limited by the drive signal of the aberration correction mechanism.

15. An optical disc apparatus according to claim 14, characterized in that the aberration correction mechanism corrects the wavefront of the laser beam by a liquid crystal.

16. An optical disc apparatus according to claim 14, characterized in that the actuator movably holds a movable subject by a plurality of springs and transmits the transmission signal to the movable subject through the springs.

17. An optical disc apparatus according to claim 14, characterized in that the demodulation circuit separates the drive signal of the aberration correction mechanism by detecting a bias common to the pair of lines by a detection circuit.

18. An optical disc apparatus according to claim 17, characterized in that the detection circuit is a diode detection circuit.

19. An optical disc apparatus according to claim 14, characterized in that the demodulation circuit is composed of only passive elements.

20. An optical disc apparatus according to claim 14, characterized in that:
the drive signal of the aberration correction mechanism is formed of first and second drive signals;
the transmission unit multiplexes the first drive signal by limiting the positive amplitude value or the negative amplitude value of the rectangular wave signal by the first drive signal with respect to the tracing control drive signal of the actuator to thereby commonly bias the corresponding pair of lines; and
the transmission unit multiplexes the second drive signal by limiting the positive amplitude value or the negative amplitude value of the rectangular wave signal by the second drive signal with respect to the focus control drive signal of the actuator to thereby commonly bias the corresponding pair of lines.

* * * * *